(12) United States Patent
Hasegawa et al.

(10) Patent No.: US 11,528,378 B2
(45) Date of Patent: Dec. 13, 2022

(54) IMAGE FORMING APPARATUS AND IMAGE FORMING METHOD TO DISPLAY A NUMBER OF NORMAL SHEETS TOGETHER WITH A NUMBER OF DEFECTIVE SHEETS

(71) Applicant: CANON KABUSHIKI KAISHA, Tokyo (JP)

(72) Inventors: Teppei Hasegawa, Toride (JP); Kazuo Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/823,559

(22) Filed: Mar. 19, 2020

(65) Prior Publication Data
US 2020/0314274 A1    Oct. 1, 2020

(30) Foreign Application Priority Data

Mar. 29, 2019   (JP) .............................. JP2019-068835

(51) Int. Cl.
*H04N 1/00*   (2006.01)

(52) U.S. Cl.
CPC ..... *H04N 1/00663* (2013.01); *H04N 1/00029* (2013.01); *H04N 1/00079* (2013.01); *H04N 1/00082* (2013.01); *H04N 1/00824* (2013.01); *H04N 1/00633* (2013.01)

(58) Field of Classification Search
CPC ........... H04N 1/00663; H04N 1/00079; H04N 1/00029; H04N 1/00824; H04N 1/00082; H04N 1/00633
See application file for complete search history.

(56) References Cited

U.S. PATENT DOCUMENTS

| | | | |
|---|---|---|---|
| 9,544,447 B2 | 1/2017 | Shijoh | |
| 10,126,695 B2 | 11/2018 | Miyahara | |
| 10,379,791 B2 | 8/2019 | Fukuda | |
| 10,546,160 B2 | 1/2020 | Ackley | |
| 10,735,601 B2 | 8/2020 | Morita | |
| 10,867,145 B2 | 12/2020 | Zhao | |
| 2006/0215220 A1* | 9/2006 | Yamahara | G06F 3/0482 358/1.15 |
| 2008/0151307 A1* | 6/2008 | Minamida | H04N 1/00082 358/3.24 |
| 2010/0033743 A1 | 2/2010 | Hirai | |
| 2010/0097624 A1* | 4/2010 | Hirakawa | G03G 15/5062 358/1.12 |

(Continued)

FOREIGN PATENT DOCUMENTS

JP         2010-42521 A      2/2010

*Primary Examiner* — Juan M Guillermety
(74) *Attorney, Agent, or Firm* — Canon U.S.A., Inc. I.P. Division

(57) ABSTRACT

An image forming apparatus includes a printing unit, a verification unit, an insertion unit, and a display unit. The printing unit prints an image on a recording sheet. The verification unit verifies the image printed by the printing unit. The insertion unit inserts an insertion sheet, on which an identifier is printed, to partition a plurality of recording sheets, on each of which the image is printed, for each bundle of a predetermined number of sheets. The display unit displays the number of recording sheets on each of which an image associated with the identifier and determined as a normal image by the verification unit is printed.

16 Claims, 28 Drawing Sheets

(56) References Cited

U.S. PATENT DOCUMENTS

| | | | |
|---|---|---|---|
| 2011/0129239 A1* | 6/2011 | Kubota | G03G 15/2032 |
| | | | 399/16 |
| 2011/0292453 A1* | 12/2011 | Saluja | B41J 11/46 |
| | | | 358/3.28 |
| 2012/0287455 A1 | 11/2012 | Sawano | |
| 2012/0321327 A1* | 12/2012 | Umeda | H04N 1/00082 |
| | | | 399/15 |
| 2014/0146370 A1* | 5/2014 | Banner | H04N 1/00082 |
| | | | 358/406 |
| 2014/0270396 A1* | 9/2014 | Miyagawa | H04N 1/0049 |
| | | | 382/112 |
| 2018/0059603 A1* | 3/2018 | Miyahara | H04N 1/00076 |
| 2018/0152573 A1* | 5/2018 | Taki | H04N 1/00602 |
| 2018/0157446 A1 | 6/2018 | Fukuda | |
| 2019/0132454 A1* | 5/2019 | Fukase | H04N 1/00082 |
| 2019/0149669 A1* | 5/2019 | Morita | G06F 3/1208 |
| | | | 382/112 |
| 2020/0314279 A1* | 10/2020 | Wakai | H04N 1/00824 |
| 2021/0141572 A1* | 5/2021 | Kuroda | G06F 3/1288 |

\* cited by examiner

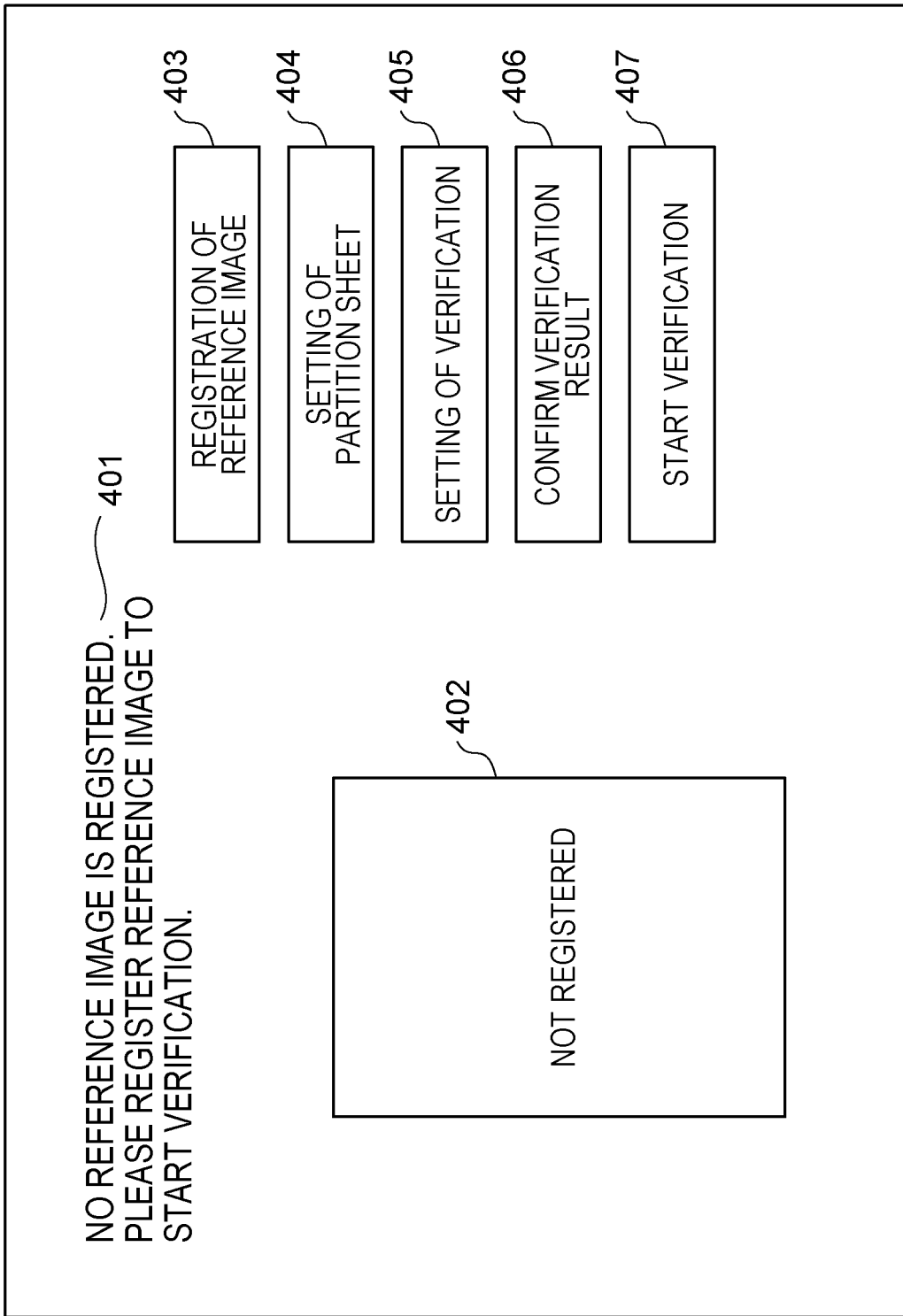

REGISTRATION OF REFERENCE IMAGE

NUMBER OF SHEETS PER ONE COPY

SIDE TO BE VERIFIED

| | |
|---|---|
| ☑ | DOUBLE SIDES |
| | ONLY FRONT SIDE |
| | ONLY BACK SIDE |

502

START REGISTRATION OF REFERENCE IMAGE — 503

FIG. 5A
REFERENCE IMAGE IS BEING READ ...
NUMBER OF SHEETS PER ONE COPY
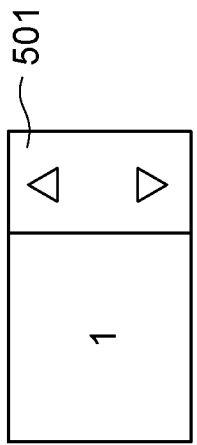
SIDE TO BE VERIFIED
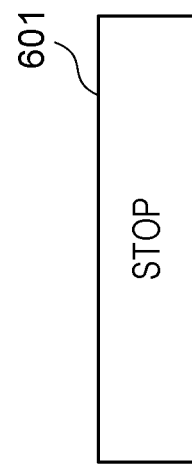

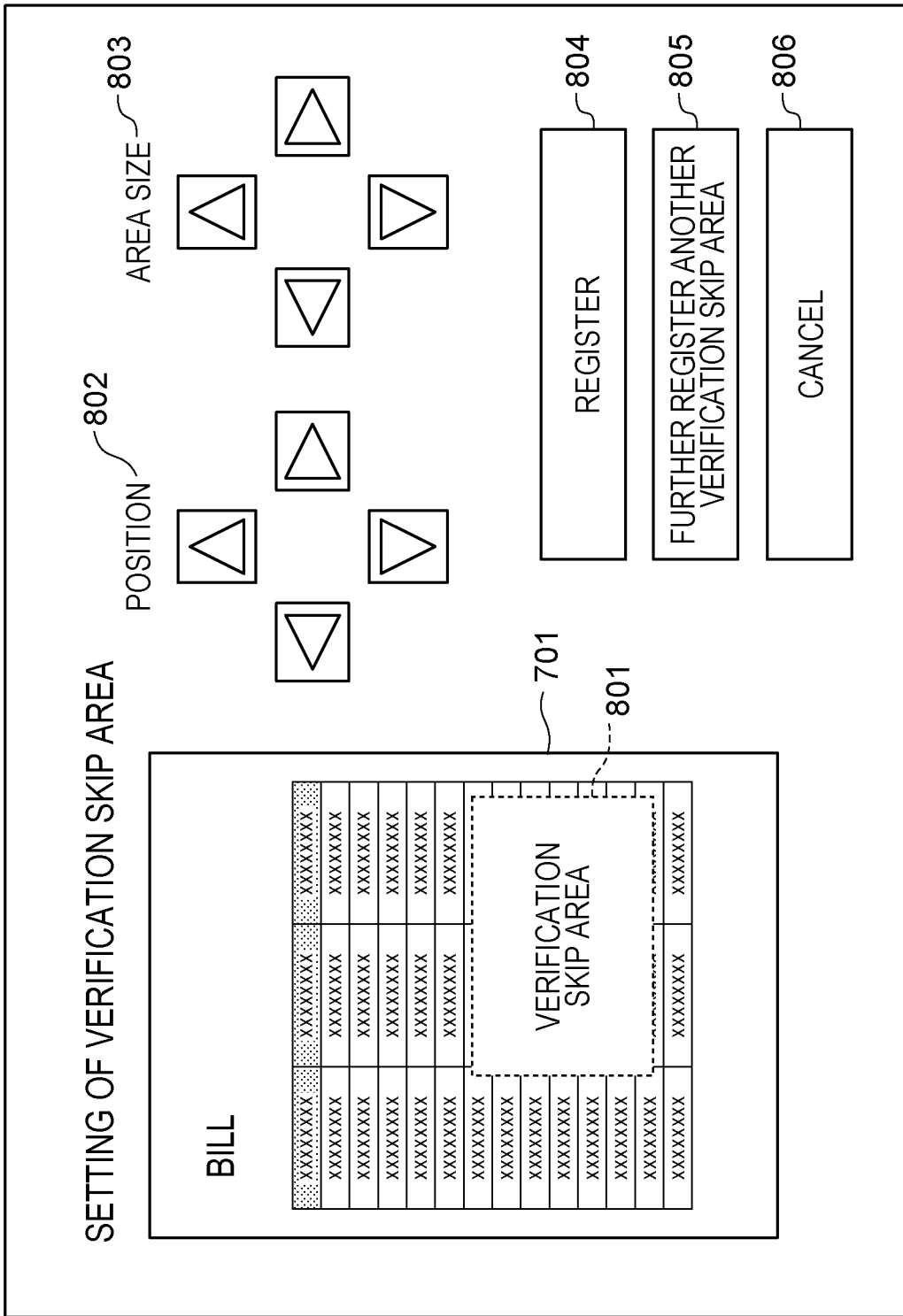

FIG. 6B

SETTING OF PARTITION SHEET

NUMBER OF REGISTERED PARTITION SHEETS 901
1
◁ ▷

READING SIDE

902
| DOUBLE SIDES |
| ↵ ONLY FRONT SIDE |
| ONLY BACK SIDE |

903
READ PARTITION SHEET IMAGE

FIG. 7A
PARTITION SHEET IMAGE IS BEING READ ...
NUMBER OF PARTITION SHEETS — 901
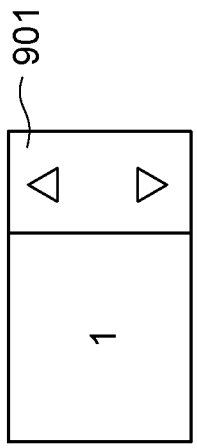
READING SIDE — 902
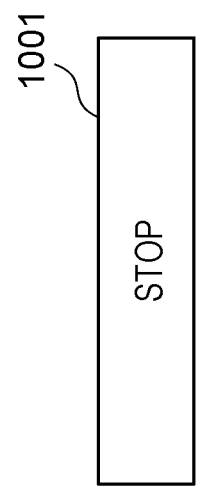
STOP — 1001

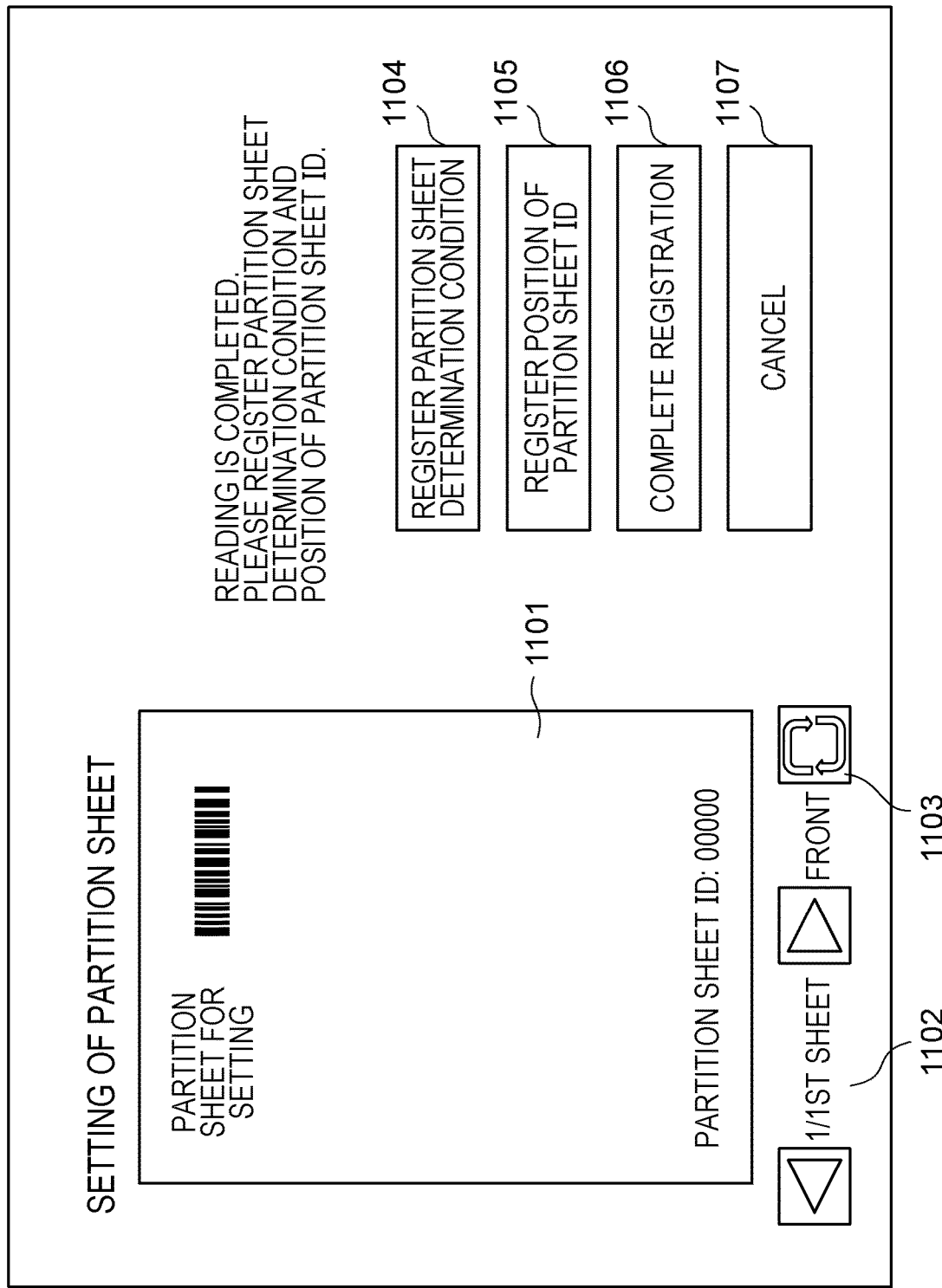

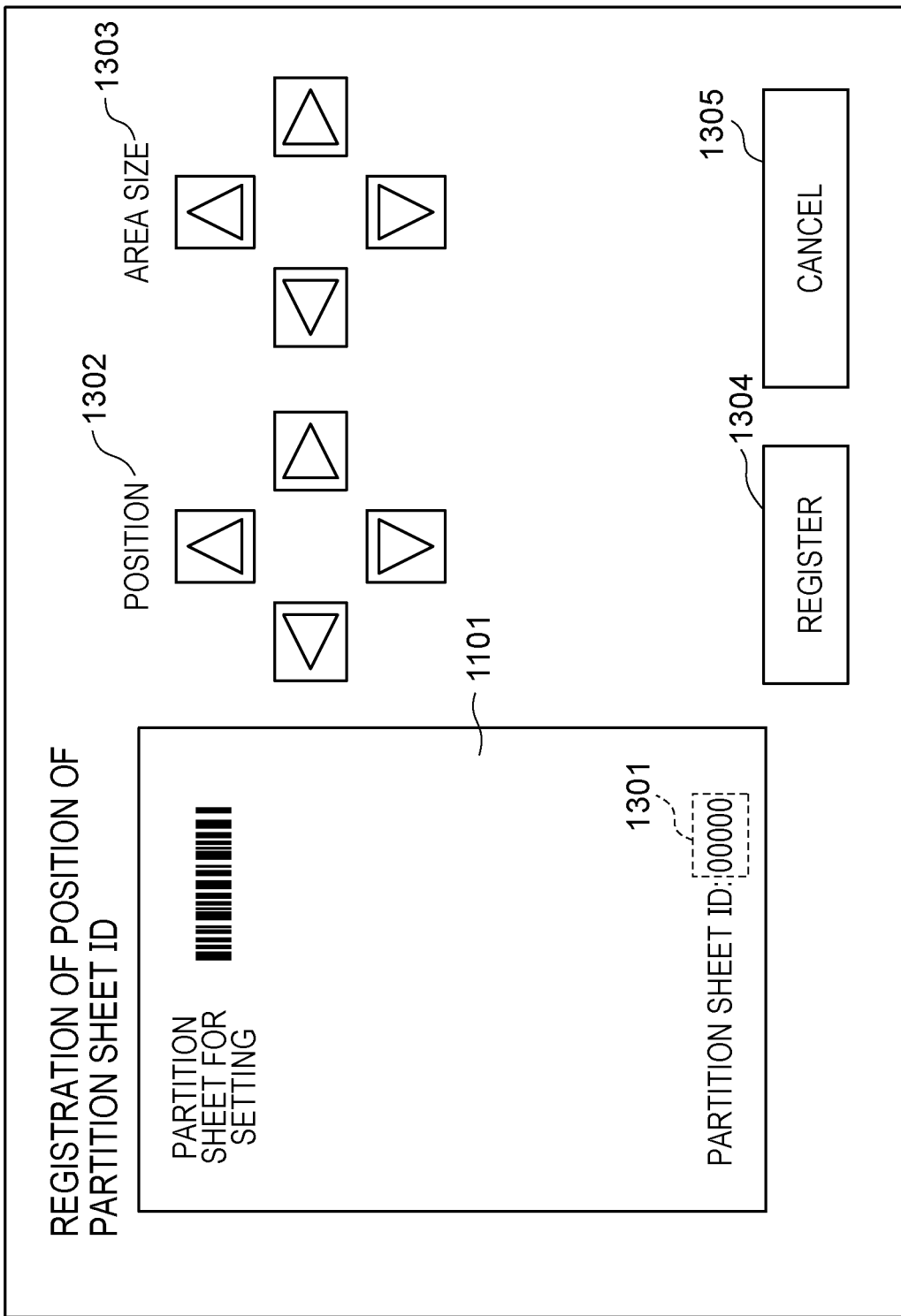

FIG. 9A

SETTING OF VERIFICATION

VERIFICATION LEVEL

1401

◁ ▷

LEVEL 3

AS VERIFICATION LEVEL BECOMES HIGHER, IMAGE IS DETERMINED AS DEFECTIVE IMAGE EVEN WHEN DIFFERENCE IS SLIGHT

VERIFICATION TYPE

1402

| | |
|---|---|
| ↘ | POSITION |
| ↘ | COLOR SHADE |
| | DENSITY |
| ↘ | STREAK |
| ↘ | MISSING |

VERIFICATION RESULT — 1501

| TIME | MARCH 6 10:10 |
|---|---|
| JOB NAME | BILL |
| NUMBER OF VERIFIED SHEETS | 1000 SHEETS |
| NUMBER OF OK SHEETS | 986 SHEETS |
| NUMBER OF NG SHEETS | 14 SHEETS |
| NUMBER OF PARTITION SHEETS | 20 SHEETS |

VERIFICATION RESULT OBTAINED FOR EACH OF PARTITION SHEETS — 1502

| PARTITION SHEET ID | OK | NG |
|---|---|---|
| 10001 | 49 SHEETS | 1 SHEET |
| 10002 | 48 SHEETS | 2 SHEETS |
| 10003 | 50 SHEETS | 0 SHEET |
| 10004 | 49 SHEETS | 1 SHEET |
| 10005 | 50 SHEETS | 0 SHEET |
| 10006 | 50 SHEETS | 0 SHEET |
| 10007 | 48 SHEETS | 2 SHEETS |

OK — 1504

1503 — 1/9TH JOB

PREVIOUS JOB   NEXT JOB

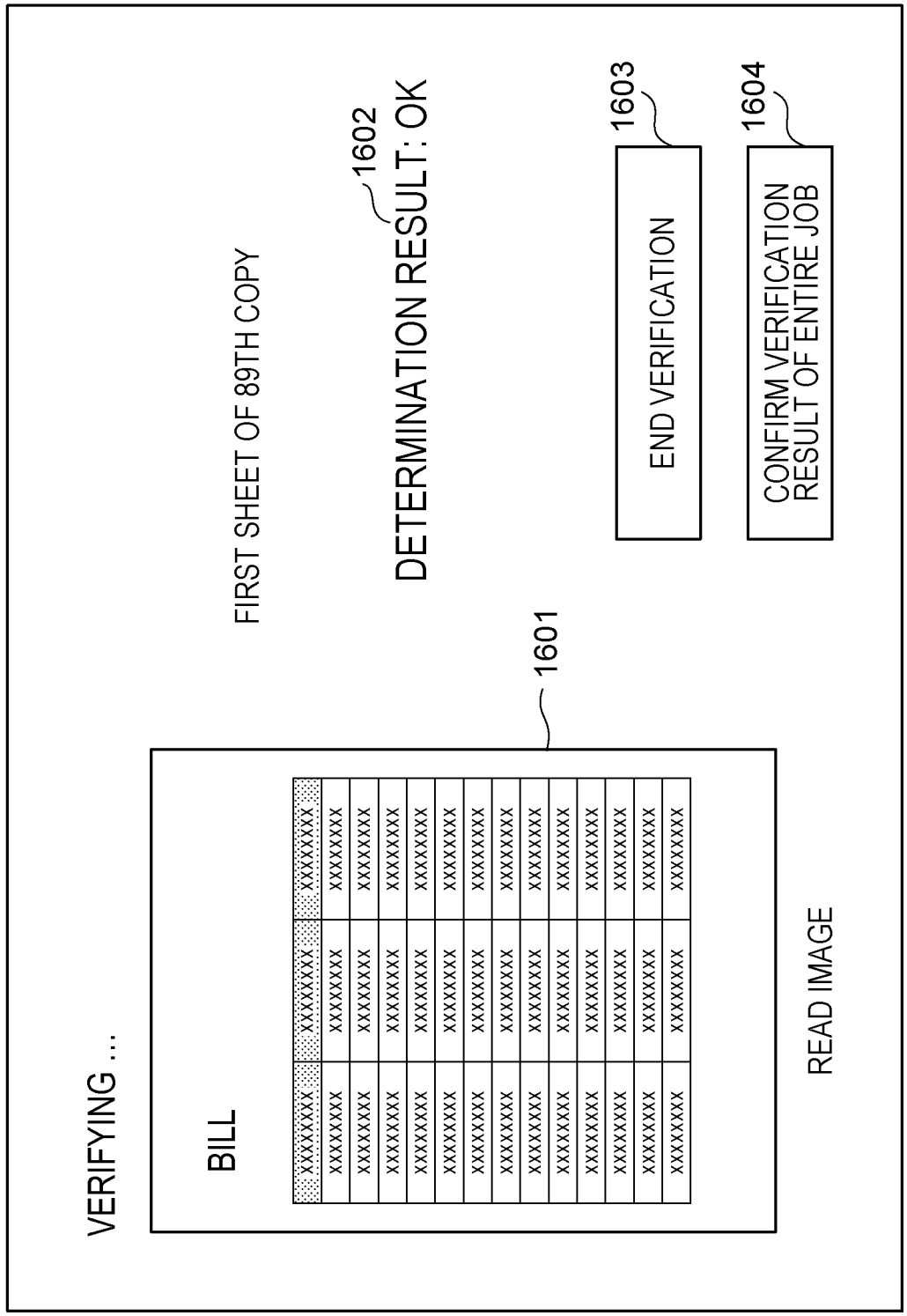

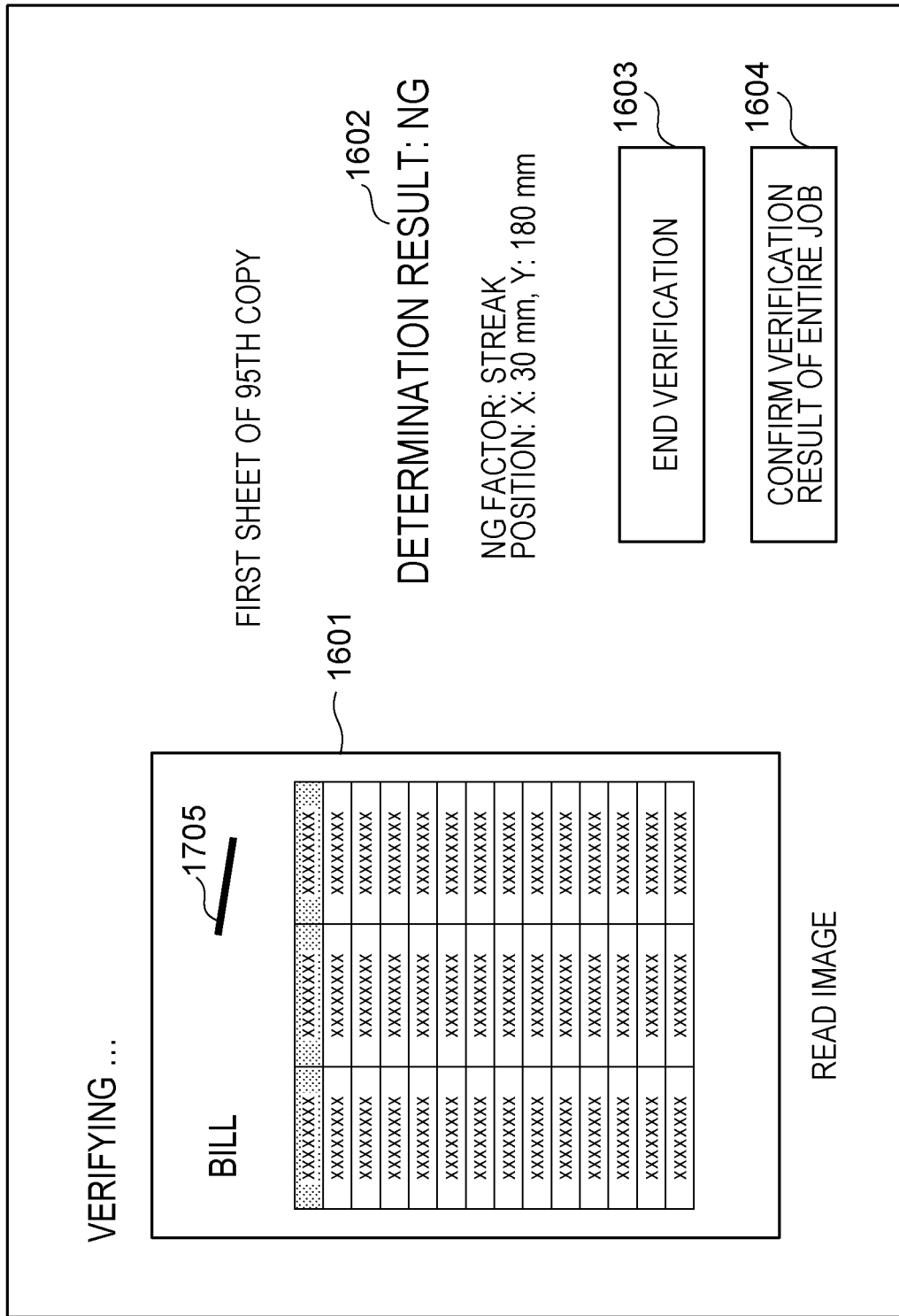

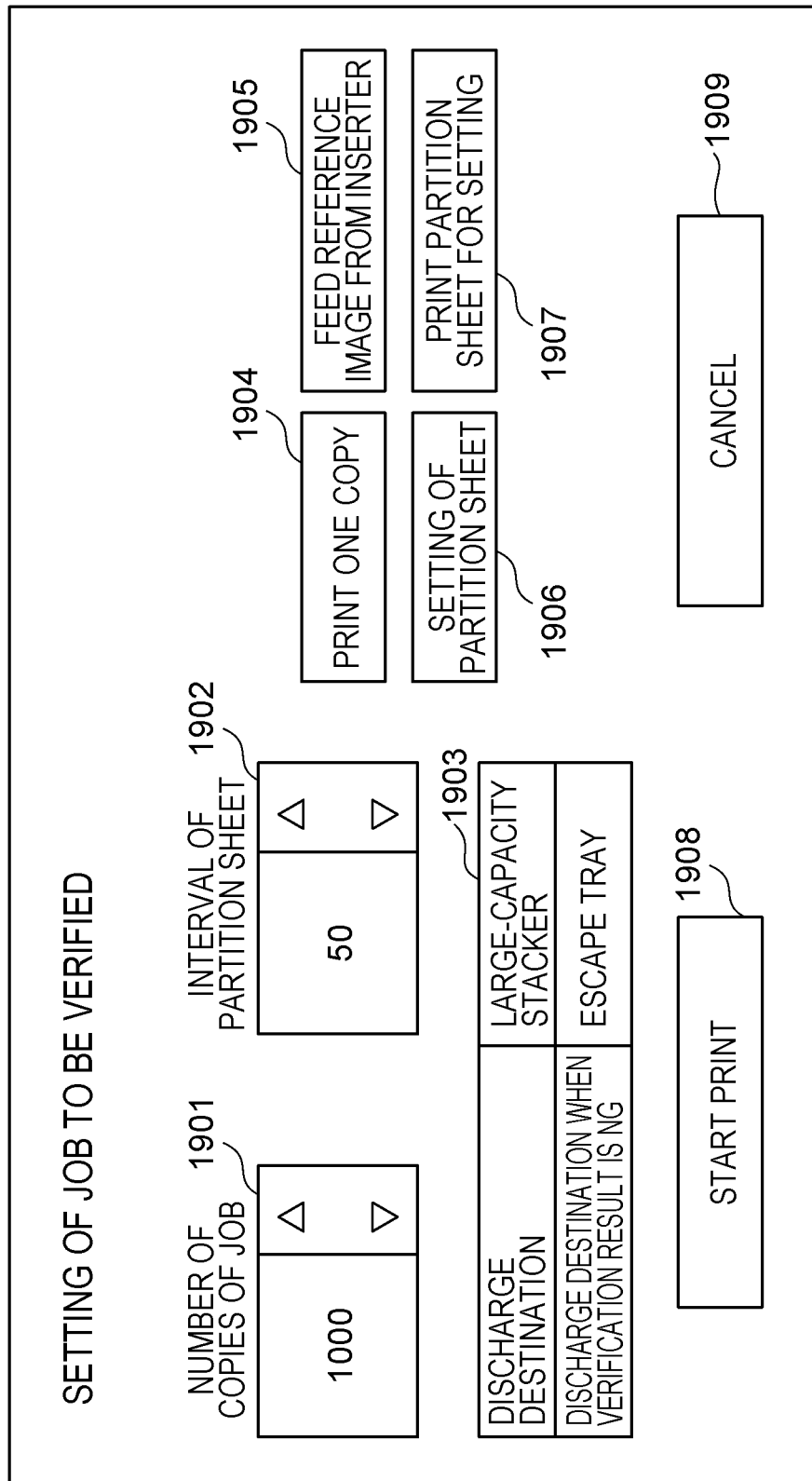

IMAGE FORMING APPARATUS AND IMAGE FORMING METHOD TO DISPLAY A NUMBER OF NORMAL SHEETS TOGETHER WITH A NUMBER OF DEFECTIVE SHEETS

BACKGROUND

Field

The present disclosure relates to an image forming apparatus, an image forming method, and a program.

Description of the Related Art

A printing system by which a sheet printed by a printer is able to be verified by a verification device while the sheet is conveyed has been recently known. In verification of a printed sheet, the verification device cads an image of the printed sheet that is conveyed, and determines whether or not the printed sheet is normal by performing image analysis of the read image. The verification device is able to detect, for example, missing of a bar code or a ruled line, image missing, defective printing, page missing, color misregistration, and the like. In a case where the printed sheet is thereby determined as a defective sheet, the defective sheet is discharged to a discharge destination different from that of a normal sheet. This prevents the defective sheet from being mixed in the normal sheet, and enables an operator to discard the defective sheet.

According to a technique disclosed in Japanese Patent Laid-Open No. 2010-42521, discharge destinations of a printed sheet determined as a normal sheet by a verification device and a printed sheet determined as a defective sheet by the verification device are able to be sorted.

However, Japanese Patent Laid-Open No. 2010-42521 does not refer to a configuration in which a print job composed of a plurality of pages is printed and verified and sheets are discharged by inserting a partition sheet for each of bundles of sheets with a predetermined number of pages, so that the number of normal sheets and the number of defective sheets are not able to be grasped for each of bundles.

SUMMARY

According to an aspect of the present disclosure, an image forming apparatus includes a printing unit configured to print an image on a recording sheet, a verification unit configured to verify the image printed by the printing unit, an insertion unit configured to insert an insertion sheet, on which an identifier is printed, to partition a plurality of recording sheets, on each of which the image is printed, for each bundle of a predetermined number of sheets, and a display unit configured to display the number of recording sheets on each of which an image associated with the identifier and determined as a normal image by the verification unit is printed.

Further features of the present disclosure will become apparent from the following description of exemplary embodiments with reference to the attached drawings.

BRIEF DESCRIPTION OF THE DRAWINGS

FIGS. 4A and 4B each illustrate an example of a display screen when a reference image is registered in a verification device.

FIGS. 5A and 5B each illustrate an example of a display screen when the verification device reads the reference image.

FIG. 6A illustrates an example of a display screen when a verification skip area is set in the verification device and FIG. 6B illustrates an example of a display screen when setting of a partition sheet is performed from the verification device.

FIGS. 7A and 7B each illustrate an example of a display screen when the verification device reads a partition sheet image.

FIGS. 8A and 8B each illustrate an example of a display screen when setting of a partition sheet determination condition and a position of a partition sheet ID is performed from the verification device.

FIG. 9A illustrates an example of a display screen when setting of verification is performed from the verification device and FIG. 9B illustrates an example of a display screen when the verification device displays a verification result.

FIG. 10A illustrates an example of a display screen when the verification device determines that a verification result is OK and FIG. 10B illustrates an example of a display screen when the verification device determines that a verification result is NG.

FIG. 11A illustrates an example of a display screen when the verification device skips verification and FIG. 11B illustrates an example of a display screen when setting of a job to be verified is performed from an external controller.

DESCRIPTION OF THE EMBODIMENTS

Preferred embodiments for implementing the disclosure will be described below with reference to drawings.

In the following explanation, an external controller may be referred to as an image processing controller, a digital front end, a print server, a DFE, or the like. An image forming apparatus may be referred to as a multifunctional peripheral or an MFP.

Embodiment 1

Figure 1:
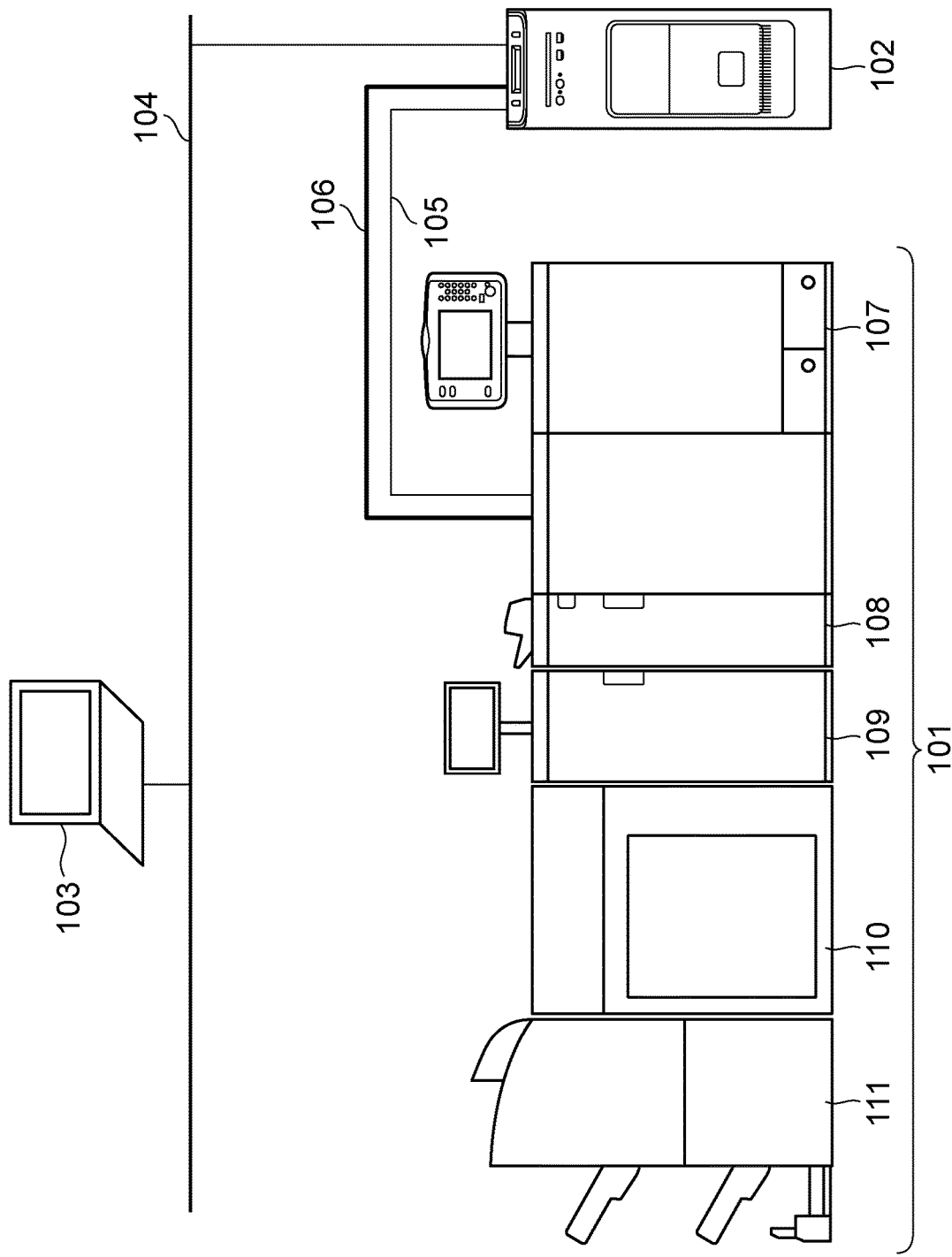
FIG. 1 is an overall view of a hardware configuration of a printing system.

FIG. 1 is an overall view of a hardware configuration of an image processing system according to the present embodiment. The image processing system includes an image forming apparatus 101 and an external controller 102. The image forming apparatus 101 and the external controller 102 are connected so as to be capable of communication via an internal LAN 105 and a video cable 106. The external controller 102 is connected to a client PC 103 so as to be capable of communication via an external LAN 104 and a print instruction is given from the client PC 103 to the external controller 102.

In the client PC 103, a printer driver having a function of converting print data into a print description language that is able to be processed in the external controller 102 is installed. A user who performs printing is able to give a print instruction from various applications via the printer driver. The printer driver transmits print data to the external controller 102 on the basis of the print instruction from the user. When receiving the print instruction from the client PC 103, the external controller 102 performs data analysis and rasterizing processing, inputs the print data to the image forming apparatus 101, and gives a print instruction.

Next, the image forming apparatus 101 will be described. The image forming apparatus 101 is configured so that a plurality of devices having a plurality of different functions are connected and complicated printing processing such as bookbinding is able to be performed.

A printer 107 forms an image by using toner on a sheet that is conveyed from a sheet feed portion located at a lower portion of the printer 107. A configuration and an operating principle of the printer 107 are as follows. A light beam, such as laser light, which is modulated in accordance with image data is reflected by a rotary polygon mirror such as a polygon mirror to irradiate a photosensitive drum as scanning light. An electrostatic latent image formed on the photosensitive drum by the laser light is developed by toner and the toner image is transferred onto a sheet stuck on a transfer drum. By sequentially performing a series of image forming processes for toner of yellow (Y), magenta (M), cyan (C), and black (K), a full color image is formed on the sheet. The sheet on the transfer drum, on which the full-color image is formed, is conveyed to a fixing device. The fixing device includes a roller, a belt, and the like, contains a heat source such as a halogen heater in the roller, and melts the toner on the sheet, onto which the toner image is transferred, by heat and pressure to fix the toner onto the sheet.

An inserter 108 is used to insert an insertion sheet. The inserter 108 is able to insert a sheet between any sheets of a sheet group printed and conveyed by the printer 107.

The verification device 109 is an apparatus that reads an image of a conveyed sheet, compares the image to a reference image registered in advance, and thereby determines whether the printed image is normal.

A large-capacity stacker 110 is able to stack a large volume of sheets therein. A finisher 111 is used to apply finishing processing to a conveyed sheet. The finisher 111 is able to perform finishing such as stapling, punching, and saddle-stitching bookbinding and discharges a bookbinding article after the finishing processing to a discharge tray.

Though the printing system described in FIG. 1 has a configuration in which the external controller 102 is connected to the image forming apparatus 101, the present embodiment is not limited to the configuration in which the external controller 102 is connected. That is, a configuration in which the image forming apparatus 101 is connected to the external LAN 104 and print data that is able to be processed by the image forming apparatus 101 is transmitted from the client PC 103 to the image forming apparatus 101 may be adopted. In this case, data analysis and rasterizing processing are performed in the image forming apparatus 101 and printing processing is performed.

Figure 2:
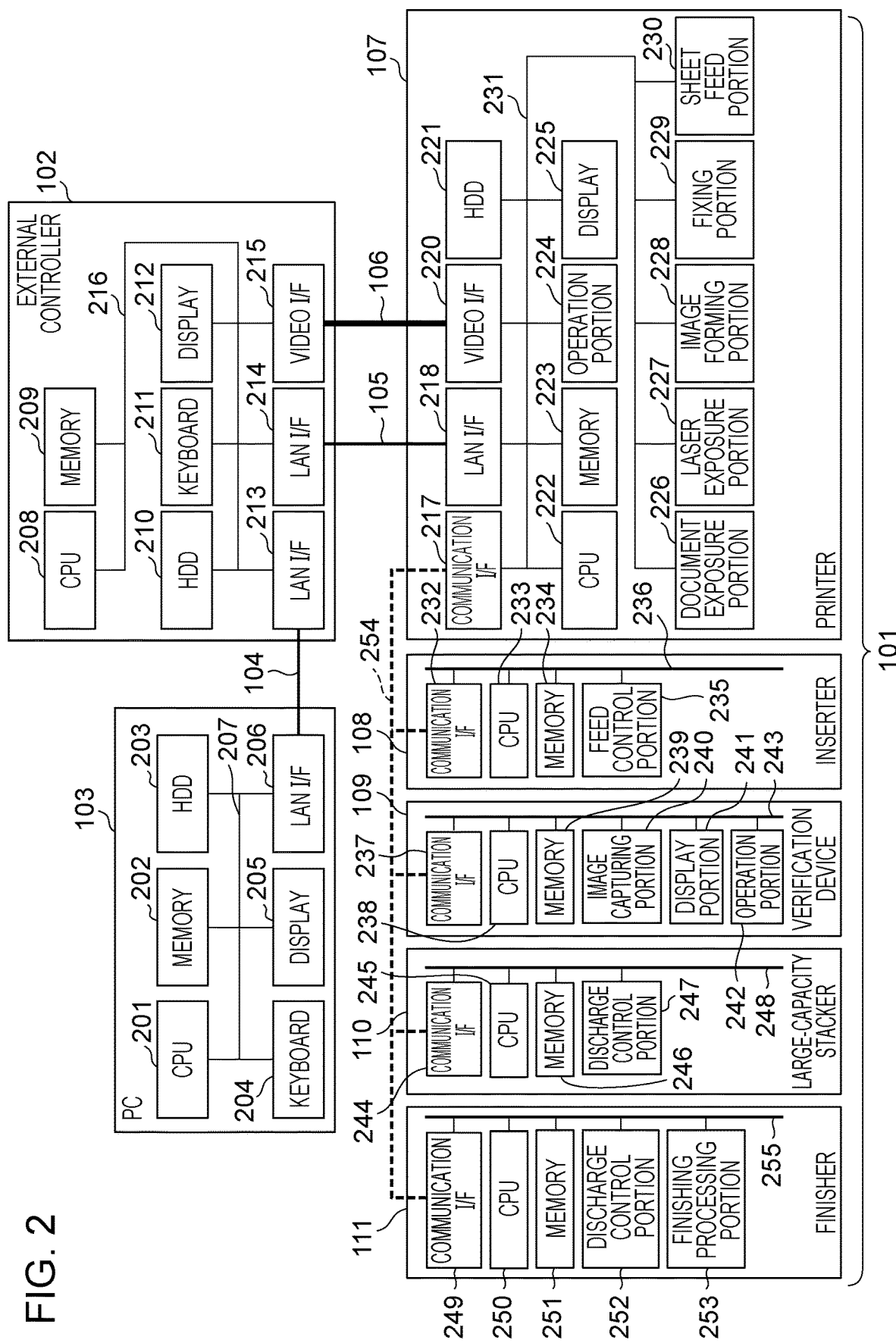
FIG. 2 is a block diagram illustrating a system configuration of the printing system.

FIG. 2 is a block diagram illustrating a system configuration of the image forming apparatus 101, the external controller 102, and the client PC 103.

First, a configuration of the printer 107 of the image forming apparatus 101 will be described. The printer 107 of the image forming apparatus 101 is constituted by a communication I/F 217, a LAN I/F 218, a video I/F 220, an HDD 221, a CPU 222, a memory 223, an operation portion 224, and a display 225. Further, the printer 107 of the image forming apparatus 101 includes a document exposure portion 226, a laser exposure portion 227, an image forming portion 228, a fixing portion 229, and a sheet feed portion 230. The respective components are connected via a system bus 231.

The communication I/F 217 is connected to the inserter 108, the verification device 109, the large-capacity stacker 110, and the finisher 111 via a communication cable 254, and performs communication for control of the respective devices. The LAN I/F 218 is connected to the external controller 102 via the internal LAN 105, and performs communication of print data or the like. The video I/F 220 is connected to the external controller 102 via the video cable 106, and performs communication of image data or the like.

The HDD 221 is a storage device in which a program and data are saved. The CPU 222 performs image processing control and control of printing on the basis of the program and the like saved in the HDD 221. A program, which is necessary for the CPU 222 to perform various kinds of processing, and image data are stored in the memory 223 and the memory 223 operates as a work area. The operation portion 224 receives input of various kinds of setting and an instruction of an operation from the user. The display 225 displays information about setting of an image processing apparatus, a processing situation of a print job, and the like.

The document exposure portion 226 performs processing of reading a document at a time of using a copy function or a scan function. The document exposure portion 226 reads document data by photographing an image with a CCD camera, while illuminating a sheet set by the user with an exposure lamp. The laser exposure portion 227 is a device that performs primary charge for irradiating the photosensitive drum with laser light to transfer a toner image, and laser exposure. The laser exposure portion 227 firstly performs primary charge that charges a photosensitive drum surface to a uniform negative electric potential. Next, the laser exposure portion 227 irradiates the photosensitive drum with laser light by a laser driver while adjusting a reflection angle with a polygon mirror. Thereby, negative electric charges in the irradiated portion are neutralized and an electrostatic latent image is formed. The image forming portion 228 is a device that transfers toner onto a sheet, is constituted by a development unit, a transfer unit, a toner supply portion, and the like, and transfers the toner on the photosensitive drum onto the sheet. The development unit attaches toner negatively charged to the electrostatic latent image on the photosensitive drum surface from a development cylinder, and visualizes the electrostatic latent image. The transfer unit performs primary transfer that applies a positive electric potential to a primary transfer roller to transfer the toner on the photosensitive drum surface onto a transfer belt, and secondary transfer that applies a positive electric potential to a secondary transfer outer roller to transfer the toner on the transfer belt onto a sheet. The fixing portion 229 is a device for fusing and fixing the toner, which is on the sheet, to the sheet with heat and pressure, and is constituted by a heating heater, a fixing belt, a pressure belt, and the like. The sheet feed portion 230 is a device for feeding a sheet, and a feeding operation and a conveyance operation of a sheet are controlled by rollers and various sensors.

Next, a configuration of the inserter 108 of the image forming apparatus 101 will be described. The inserter 108 of the image forming apparatus 101 includes a communication I/F 232, a CPU 233, a memory 234, and a feed control portion 235. The respective components are connected via a system bus 236. The communication I/F 232 is connected to the printer 107 via the communication cable 254 and performs communication necessary for control. The CPU 233 performs various kinds of control necessary for feed in accordance with a control program stored in the memory 234. The memory 234 is a storage device in which the control program is saved. The feed control portion 235 controls feed and conveyance of a sheet, which is conveyed from a sheet feed portion of the inserter 108 or the printer 107, while controlling rollers and sensors on the basis of an instruction from the CPU 233.

Next, a configuration of the verification device 109 of the image forming apparatus 101 will be described. The verification device 109 of the image forming apparatus 101 is constituted by a communication I/F 237, a CPU 238, a memory 239, an image capturing portion 240, a display portion 241, and an operation portion 242. The respective components are connected via a system bus 243. The communication I/F 237 is connected to the printer 107 via the communication cable 254 and performs communication necessary for control. The CPU 238 performs various kinds of control necessary for verification in accordance with a control program stored in the memory 239. The memory 239 is a storage device in which the control program is saved. The image capturing portion 240 captures an image of a conveyed sheet in accordance with an instruction of the CPU 238. The CPU 238 compares the image captured by the image capturing portion 240 to a reference image saved in the memory 239 (storage portion) and determines whether the printed image is normal. The display portion 241 displays a verification result, a setting screen, and the like. The operation portion 242 is operated by the user and receives an instruction, for example, to change setting of the verification device 109 or register the reference image.

Next, a configuration of the large-capacity stacker 110 of the image forming apparatus 101 will be described. The large-capacity stacker 110 of the image forming apparatus 101 is constituted by a communication I/F 244, a CPU 245, a memory 246, and a discharge control portion 247. The respective components are connected via a system bus 248. The communication I/F 244 is connected to the printer 107 via the communication cable 254 and performs communication necessary for control. The CPU 245 performs various kinds of control necessary for discharge in accordance with a control program stored in the memory 246. The memory 246 is a storage device in which the control program is saved. The discharge control portion 247 performs control to convey a conveyed sheet to a stack tray, an escape tray, or the subsequent finisher 111 in accordance with an instruction from the CPU 245.

Next, a configuration of the finisher 111 of the image forming apparatus 101 will be described. The finisher 111 of the image forming apparatus 101 is constituted by a communication I/F 249, a CPU 250, a memory 251, a discharge control portion 252, and a finishing processing portion 253. The respective components are connected via a system bus 255. The communication I/F 249 is connected to the printer 107 via the communication cable 254 and performs communication necessary for control. The CPU 250 performs various kinds of control necessary for finishing or discharge in accordance with a control program stored in the memory 251. The memory 251 is a storage device in which the control program is saved. The discharge control portion 252 controls conveyance and discharge of a sheet on the basis of an instruction from the CPU 250. The finishing processing portion 253 controls finishing processing such as stapling, punching, and saddle-stitching bookbinding on the basis of an instruction from the CPU 250.

Next, a configuration of the external controller 102 will be described. The external controller 102 is constituted by a CPU 208, a memory 209, an HDD 210, a keyboard 211, a display 212, a LAN I/F 213, a LAN I/F 214, and a video I/F 215. The respective components are connected via a system bus 216. The CPU 208 performs processing such as reception of print data from the client PC 103, RIP processing, and transmission of print data to the image forming apparatus 101 on the basis of a program and data stored in the HDD 210. A program, which is necessary for the CPU 208 to perform various kinds of processing, and data are stored in the memory 209, and the memory 209 operates as a work area. A program, which is necessary for an operation of printing processing or the like, and data are stored in the HDD 230. The keyboard 211 is a device for inputting an operation instruction of the external controller 102. The display 212 displays information about application in execution and the like of the external controller 102 by video signals of a still image and a moving image. The LAN I/F 213 is connected to the client PC 103 via the external LAN 104, and performs communication of a print instruction or the like. The LAN I/F 214 is connected to the image forming apparatus 101 via the internal LAN 105, and performs communication of a print instruction or the like. The video I/F 215 is connected to the image forming apparatus 101 via the video cable 106, and performs communication of print data or the like.

Next, a configuration of the client PC 103 will be described. The client PC 103 is constituted by a CPU 201, a memory 202, an HDD 203, a keyboard 204, a display 205, and a LAN I/F 206. The respective components are connected via a system bus 207. The CPU 201 creates print data or gives a print instruction on the basis of a document processing program or the like saved in the HDD 203. The CPU 201 comprehensively controls the respective devices connected to the system bus 207. A program, which is necessary for the CPU 201 to perform various kinds of processing, and data are stored in the memory 202, and the memory 202 operates as a work area. A program, which is necessary for an operation of printing processing or the like, and data are stored in the HDD 203. The keyboard 204 is a device for inputting an operation instruction of the client PC 103. The display 205 displays information about an application in execution and the like of the client PC 103 by video signals of a still image and a moving image. The LAN I/F 206 is connected to the external LAN 104, and performs communication of a print instruction or the like.

In the explanation above, the external controller 102 and the image forming apparatus 101 are connected by the internal LAN 105 and the video cable 106, but any configuration may be adopted as long as being a configuration in which data necessary for printing is able to be transmitted and received, and a connection configuration with only the video cable, for example, may be adopted. Further, the memory 202, the memory 209, the memory 223, the memory 234, the memory 239, the memory 246, and the memory 251 may be storage devices for holding data and a program. For example, a configuration in which a volatile RAM, a nonvolatile ROM, an internal HDD, an external HDD, a USB memory, or the like is substituted may be adopted.

Figure 3:
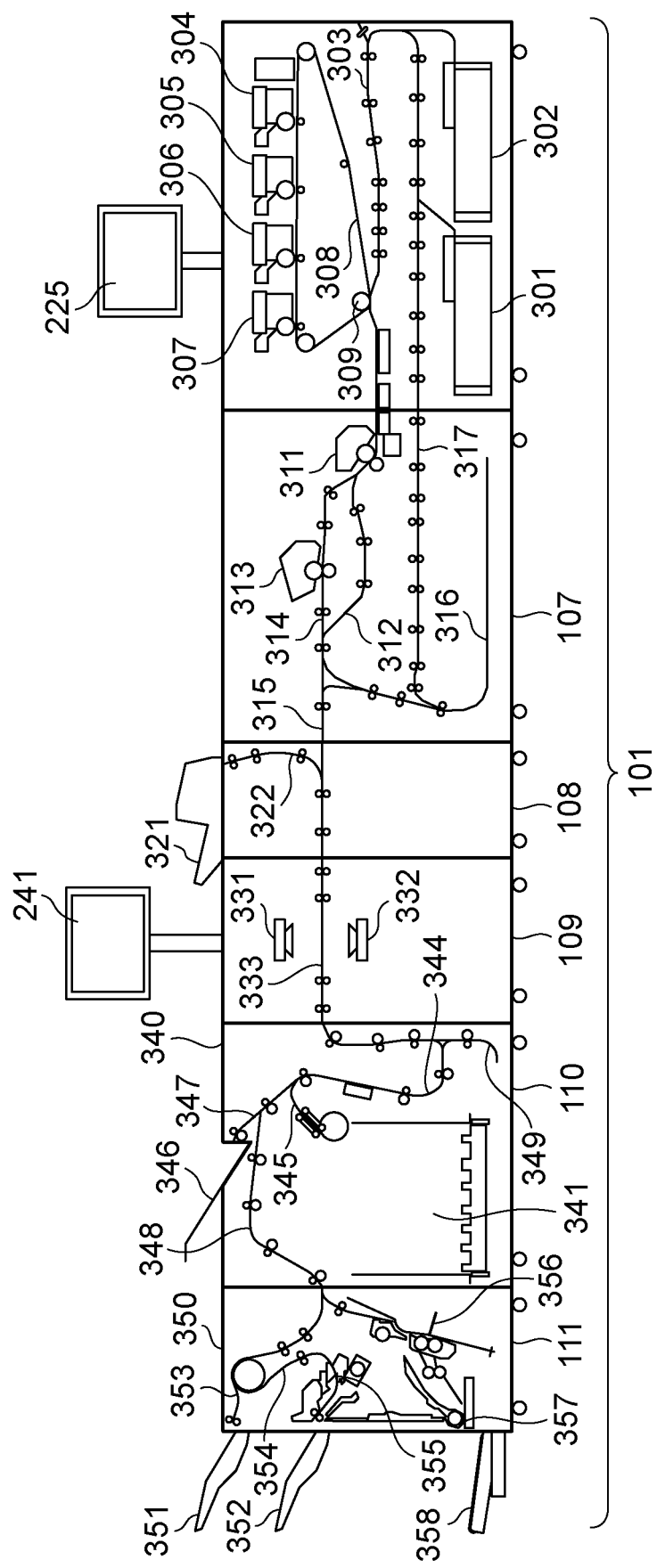
FIG. 3 is a sectional view schematically illustrating a mechanism of an image forming apparatus.

FIG. 3 is a sectional view of a mechanism of the image forming apparatus 101. The printer 107 is a device that forms an image to be printed on a sheet. In sheet feed decks 301 and 302, various sheets are able to be stored. In each of the sheet feed decks 301 and 302, only one uppermost sheet of the stored sheets is able to be separated and conveyed to a sheet conveyance path 303. In order to form a color image, development stations 304 to 307 use toner having colors of Y, M, C, and K to form toner images. The toner images formed here are primarily transferred onto an intermediate transfer belt 308. The intermediate transfer belt 308 rotates clockwise in the figure to transfer the toner images onto the sheet conveyed through the sheet conveyance path 303 at a secondary transfer position 309. The display 225 displays a print status of the image forming apparatus 101 and information for setting. A fixing unit 311 that fixes the toner images onto the sheet includes a pressure roller and a heat roller. When the sheet passes between the rollers, the fixing unit 311 melts and pressurizes the toner to fix the toner images to the sheet. The sheet that has passed through the fixing unit 311 is conveyed to a conveyance path 315 through a sheet conveyance path 312. In a case where additional melting and pressurization are required for fixation depending on a type of the sheet, after the sheet passes through the fixing unit 311, the sheet is conveyed to a second fixing unit 313 with use of an upstream sheet conveyance path. The sheet subjected to additional melting and pressurization is conveyed to the conveyance path 315 through a sheet conveyance path 314. When an image formation mode is a double-sided mode, the sheet is conveyed to a sheet inversion path 316, and after having a front side and a back side inverted in the sheet inversion path 316, the sheet is conveyed to a double-sided conveyance path 317, and an image is transferred onto a second side at the secondary transfer position 309.

The inserter 108 by which an insertion sheet is inserted includes an inserter tray 321 and causes a sheet, which is fed through a sheet conveyance path 322, to merge into the conveyance path. This makes it possible to insert a sheet at any position in a series of sheet groups conveyed from the printer 107 and convey the sheet to a subsequent device.

The sheet having passed through the inserter 108 is conveyed to the verification device 109. Cameras 331 and 332 are arranged in the verification device 109 so as to be opposed to each other. The camera 331 reads an upper side of the sheet and the camera 332 reads a lower side of the sheet. The verification device 109 is able to read images of the sheet by using the cameras 331 and 332 at a timing when the sheet conveyed in a sheet conveyance path 333 reaches a predetermined position, and determine whether the images are normal. For example, a result of verification performed by the verification device 109 is displayed in the display portion 241.

The large-capacity stacker 110 is able to stack a large volume of sheets therein. The large-capacity stacker 110 includes a stack tray 341 as a tray for stacking sheets. The sheet having passed through the verification device 109 is input to the large-capacity stacker 110 through a sheet conveyance path 344. The sheet is stacked on the stack tray 341 via a sheet conveyance path 345 from the sheet conveyance path 344. Further, the stacker 340 has an escape tray 346 as a discharge tray. The escape tray 346 is the discharge tray to which a sheet determined as a defective sheet by the verification device 109 is discharged. When being output to the escape tray 346, the sheet is conveyed to the escape tray 346 via a sheet conveyance path 347 from the sheet conveyance path 344. Note that, when the sheet is conveyed to a post-processing device on a downstream side of the large-capacity stacker 110, the sheet is conveyed via a sheet conveyance path 348. An inverting portion 349 inverts the sheet. The inverting portion 349 is used when the sheet is stacked on the stack tray 341. When being stacked on the stack tray 341, the sheet is inverted once by the inverting portion 349 so that an orientation of the sheet is made identical between when the sheet is input and when the sheet is output. When being conveyed to the escape tray 346 or the post-processing device on the downstream side, the sheet is discharged without being flipped for stacking, so that an inversion operation by the inverting portion 349 is not performed.

The finisher 111 is a finisher that performs finishing processing for a conveyed sheet conveyed in accordance with a function designated by the user. Specifically, the finisher 111 has finishing functions such as stapling (stapling at one position/two positions), punching (two holes/three holes), and saddle-stitching bookbinding. The finisher 111 includes two discharge trays 351 and 352, and outputs a sheet to the discharge tray 351 through a sheet conveyance path 353. However, finishing processing such as stapling is not able to be performed in the sheet conveyance path 353. To perform finishing processing such as stapling, the sheet is conveyed to a processing portion 355 via a sheet conveyance path 354, the finishing function designated by the user is performed for the sheet in the processing portion 355, and then, the sheet is output to the discharge tray 352. The discharge trays 351 and 352 are able to be moved up and down, and the finisher 111 is also able to operate to cause the discharge tray 351 to move downward, and stack the sheet, which is subjected to finishing processing by the processing portion 355, on the discharge tray 351. In a case where saddle-stitching bookbinding is designated, stapling is performed on a center of sheets by a saddle-stitching processing portion 356, and then, the sheets are folded into two and output to a saddle-stitching bookbinding tray 358 through a sheet conveyance path 357. The saddle-stitching bookbinding tray 358 is configured to have a belt conveyor, and a saddle-stitched book bundle stacked on the saddle-stitching bookbinding tray 358 is conveyed to a left side.

FIGS. 4A to 18 each illustrate an example of a display screen displayed in the display portion 241 of the verification device 109 and the display screen is displayed on the basis of an instruction of the CPU 238 of the verification device 109. In accordance with a verification item set in advance, the verification device 109 verifies a sheet image that is printed. The sheet image is verified by comparing a reference image that is set in advance to the sheet image that is printed. Examples of a method of comparing the images include a method using comparison of pixel values of respective image positions, a method using comparison of positions of an object by edge detection, and a method using extraction of character data by OCR (Optical Character Recognition). Examples of the verification item include a deviation of a print position, color shade of an image, a density of an image, a streak, blur, and missing print.

FIG. 4A illustrates an example of a screen displayed in the display portion 241 of the verification device 109 when the verification device 109 is activated. The display portion 241 performs display indicating that a reference image needs to be registered to start verification because no reference image is registered (401). When the reference image has been registered, display indicating that verification is able to be started is performed. The reference image that has been registered is displayed in the display portion 241 (402). In FIG. 4A, since a reference image is not registered, display indicating no registration is performed is performed. In an area 402, information about setting of verification, such as setting of a partition sheet, may be displayed in addition to the reference image.

A button 403 is used to call a registration screen of a reference image. The reference image is an image to be compared to an image read by the verification device 109 and an image that is obtained by reading a printed sheet and that is determined to be normal by visual observation or by the verification device 109 in advance is used therefor. A button 404 is used to call a setting screen of a partition sheet. When the partition sheet is compared to the reference image and determined as a defective sheet so that a discharge destination is switched, the partition sheet by which a plurality of copies of products are partitioned every fixed number of copies is not discharged to a discharge destination that is the same as that of a normal sheet. Thus, in a case where a print job including a partition sheet is verified, setting of a partition sheet is registered in advance at that time, and when a sheet is determined as a partition sheet, the partition sheet is caused to be discharged to a discharge destination that is the same as that of a normal sheet without performing verification.

A button 405 is used to call a setting screen of verification. A verification item and verification accuracy (degree of a difference from a reference image, by which an image is determined as a defective image) are set in accordance with a purpose of verification of the user. A button 406 is used to call a confirmation screen of a verification result. A past verification content and a past verification result are able to be confirmed. A button 407 is used to instruct start of verification. When verification starts, the verification device 109 starts to verify a sheet image that is fed.

Figure 4B:
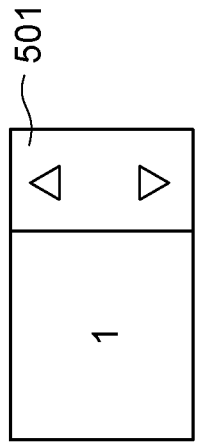

FIG. 4B illustrates an example of a screen displayed in the display portion 241 of the verification device 109 when a reference image is registered. The display screen of FIG. 4B is displayed when the button 403 of FIG. 4A is selected.

A setting portion 501 is used to set the number of sheets per one copy of a print job to be verified. In a case of a print job in which the number of sheets per one copy is two or more, the verification device 109 is able to register a plurality of images as reference images.

A setting portion 502 is used to set a side to be verified. Whether to verify both sides, only a front side, or only a hack side by the verification device 109 is able to be set. Note that, even in a case of single-side printing, setting may be performed so that both sides are verified to verify that there is no dust on a side that is not printed. A button 503 is used to instruct registration of a reference image. After the button 503 is pressed, the verification device 109 reads an image of a printed sheet that is fed, and registers the image as the reference image.

FIG. 5A illustrates an example of a screen displayed in the display portion 241 of the verification device 109 while the reference image is being read. FIG. 5A is displayed when the button 503 of FIG. 4B is pressed. The screen is displayed until reading for the number of sheets, which is set by the setting portion 501, is completed. A button 601 is used to instruct to stop reading of the reference image. When the button 601 is pressed, the screen is returned to the display screen of FIG. 4A without registering the reference image.

Figure 5B:
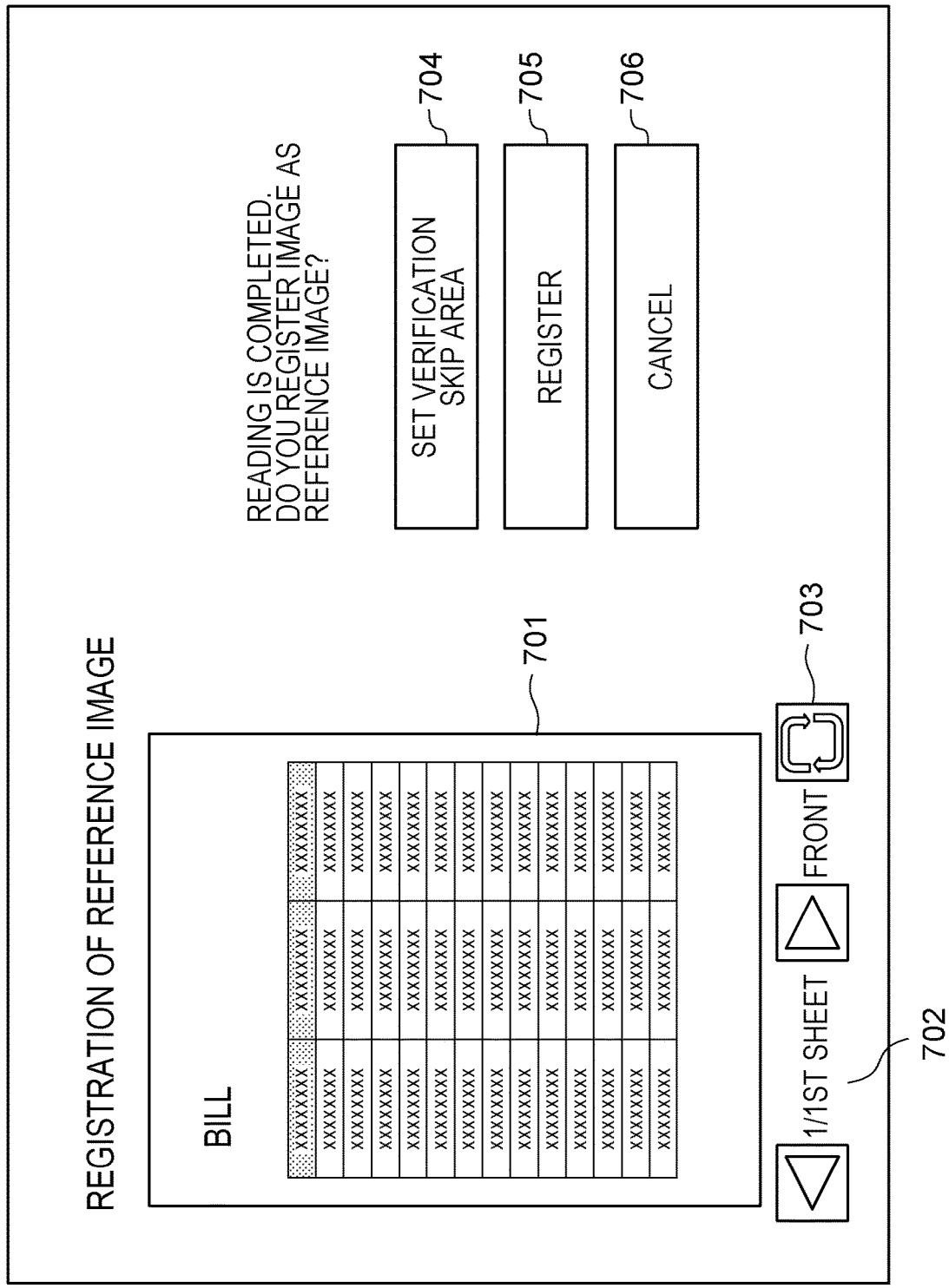

FIG. 5B illustrates an example of a screen displayed in the display portion 241 of the verification device 109 after reading of the reference image is completed. In an area 701, the image of the printed sheet read by the verification device 109 is displayed. In a case where there are a plurality of sheets, images to be displayed are able to be switched by a switch button 702, and in a case where both of a front side and a back side are verified, the front side and the back side are able to be switched by a switch button 703. A button 704 is used to instruct setting of a verification skip area. Here, an area not to be verified is able to set, for example, for a case of printing in which a print content in a specific area is changed for each copy, such as variable data printing (VDP). Examples of the case include a case where IDs different for each copy are printed and a case where only an address and a name are changed for each copy.

A button 705 is used to instruct registration of the reference image after the read image in the area 701 is confirmed. When the button 705 is pressed, the verification device 109 registers the reference image and returns the screen to the display screen of FIG. 4A. A button 706 is used to cancel the reading. When the button 706 is pressed, the verification device 109 returns the screen to the display screen of FIG. 4A without registering the reference image.

FIG. 6A illustrates an example of a setting screen of the verification skip area displayed when the button 704 is pressed. An area 801 is the verification skip area. When an instruction is given with an arrow of a position setting portion 802, a position of the area 801 is able to be changed, and when an instruction is given with an arrow of a size setting portion 803, a size of the area 801 is able to be changed. A button 804 is used to register setting of the verification skip area. When the button 804 is pressed, the verification device 109 registers the verification skip area and returns the screen to the display screen of FIG. 5B. A button 805 is used to register the verification skip area and further register another verification skip area. The verification device 109 is able to register a plurality of verification skip areas.

A button 806 is used to cancel the setting of the verification skip area. When the button 806 is pressed, the verification device 109 returns the screen to the display screen of FIG. 5B without registering the verification skip area.

FIG. 6B illustrates an example of a screen displayed in the display portion 241 of the verification device 109 when setting of a partition sheet is performed. The display screen of FIG. 6B is displayed when the button 404 of FIG. 4A is pressed. A setting portion 901 is used to set the number of registered partition sheets. In a case where a plurality of different types of partition sheets are inserted, a plurality of different partition sheets are able to be registered in the verification device 109.

A setting portion 902 is used to set a reading side of a partition sheet, including a partition sheet determination condition, and is able to set the reading side as double sides, only a front side, or only a back side. A button 903 is used to instruct reading of a partition sheet image. When the button 903 is pressed, the verification device 109 reads an image of a printed sheet that is fed, and registers the image as a partition sheet image.

FIG. 7A illustrates an example of a screen displayed in the display portion 241 of the verification device 109 while the partition sheet image is being read. FIG. 7A illustrates a screen displayed when the button 903 of FIG. 6B is pressed. The screen is displayed until reading for the number of sheets, which is set by the setting portion 901, is completed.

A button 1001 is used to instruct to stop reading of the partition sheet image. When the button 1001 is pressed, the verification device 109 returns the screen to the display screen of FIG. 4A without registering setting of the partition sheet.

FIG. 7B illustrates an example of a screen displayed in the display portion 241 of the verification device 109 after reading of the partition sheet image is completed. In an area 1101, the partition sheet image read by the verification device 109 is displayed. In a case where there are a plurality of partition sheets, images to be displayed are able to be switched by a switch button 1102, and in a case where images of both of a front side and a back side are read, the front side and the back side are able to be switched by a switch button 1103.

A button 1104 is used to register a partition sheet determination condition. In a partition sheet, a mark, such as a bar code, by which a sheet is able to be determined as the partition sheet, is printed to avoid a case where the partition sheet is determined as a defective sheet and a discharge destination is switched. When the button 1104 is selected, the verification device 109 registers a condition under which a sheet is determined as a partition sheet. A button 1105 is used to register a position of a partition sheet ID. In order to display a verification result for each of bundles partitioned by a partition sheet, different ID positions are able to be registered for each of partition sheets. By displaying the verification result for each of partition sheet IDs (bundle identifiers) that are read, the user is able to easily confirm the verification result. The partition sheet ID (bundle identifier) is an identifier peculiar to a bundle.

A button 1106 is used to register setting of the partition sheet. When the button 1106 is pressed, the verification device 109 registers setting of the partition sheet and returns the screen to the display screen of FIG. 4A. A button 1107 is used to cancel the setting of the partition sheet. When the button 1107 is pressed, the verification device 109 returns the screen to the display screen of FIG. 4A without registering the setting of the partition sheet.

Figure 8A:
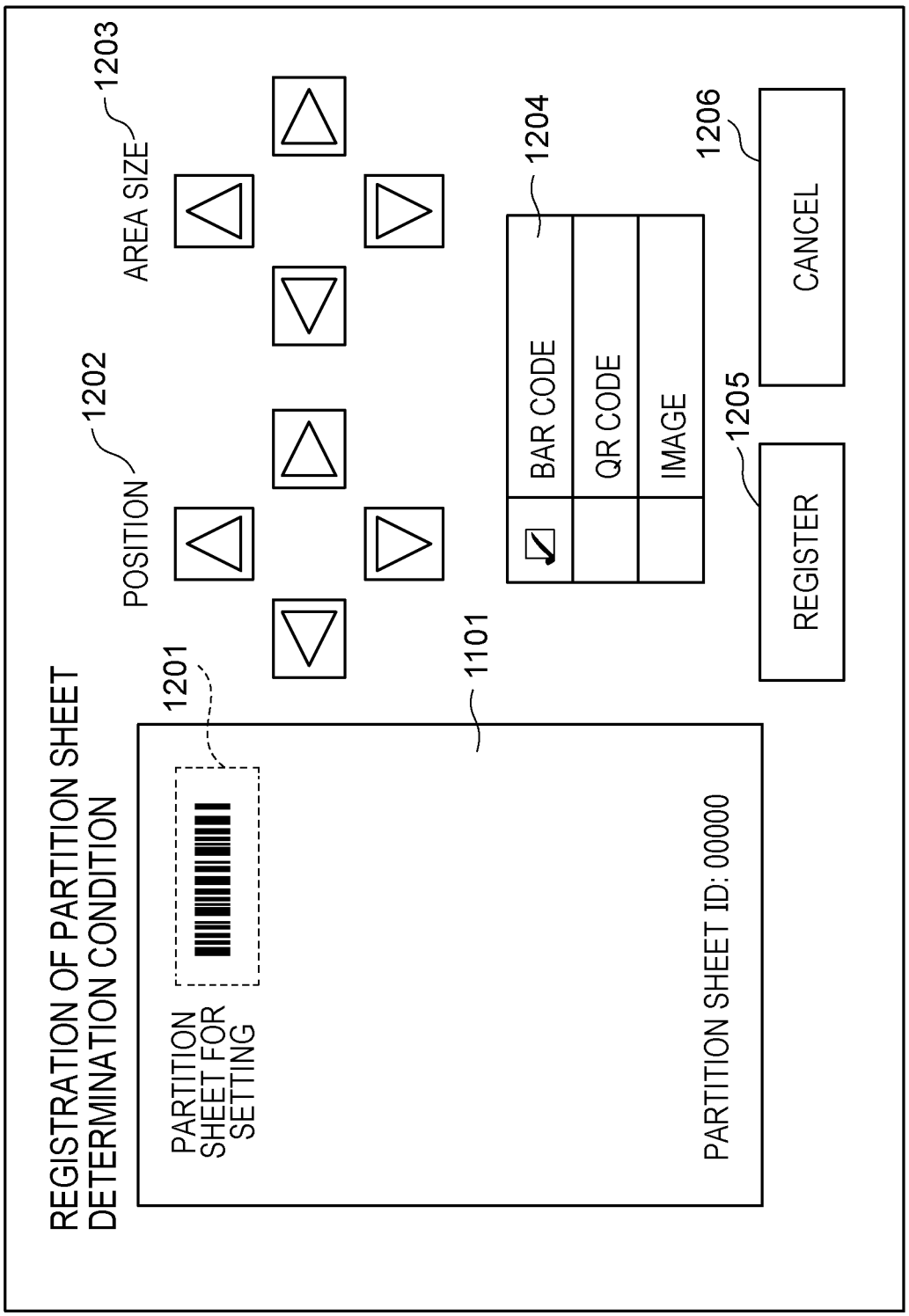

FIG. 8A illustrates an example of a registration screen of the partition sheet determination condition, which is displayed when the button 1104 of FIG. 7B is pressed. An area 1201 is a partition sheet determination area. When an instruction is given with an arrow of a position setting portion 1202, a position of the area 1201 is able to be changed, and when an instruction is given with an arrow of a size setting portion 1203, a size of the area 1201 is able to be changed.

A setting portion 1204 is a setting portion for a code or an image used for determination of the partition sheet. As another method of comparison of an image in the partition sheet determination area 1201, it is possible to select a method of detecting a bar code or a QR code (registered trademark) and determining a partition sheet from a read content of the bar code or the QR code.

A button 1205 is used to instruct registration of the partition sheet determination condition. When the button 1205 is pressed, the verification device 109 registers the partition sheet determination condition and returns the screen to the setting screen of the partition sheet of FIG. 7B. A button 1206 is used to cancel the registration of the partition sheet determination condition. When the button 1206 is pressed, the verification device 109 returns the screen to the setting screen of the partition sheet of FIG. 7B without registering the partition sheet determination condition.

FIG. 8B illustrates an example of a registration screen of a position of a partition sheet ID, which is displayed when the button 1105 of FIG. 7B is pressed. An area 1301 is an area where a position of a partition sheet ID is indicated. When an instruction is given with an arrow of a position setting portion 1302, a position of the area 1301 is able to be changed, and when an instruction is given with an arrow of a size setting portion 1303, a size of the area 1301 is able to be changed. When the position of the partition sheet ID is registered, the verification device 109 is able to read an ID every time a partition sheet is fed and display a verification result.

A button 1304 is used to instruct registration of the position of the partition sheet ID. When the button 1304 is pressed, the verification device 109 registers the position of the partition sheet ID and returns the screen to the setting screen of the partition sheet of FIG. 7B. A button 1305 is used to cancel the registration of the position of the partition sheet ID. When the button 1305 is pressed, the verification device 109 returns the screen to the setting screen of the partition sheet of FIG. 7B without registering the position of the partition sheet ID.

FIG. 9A illustrates an example of a screen displayed in the display portion 241 of the verification device 109 when setting of verification is performed. The display screen of FIG. 9A is displayed when the button 405 of FIG. 4A is pressed. A setting portion 1401 is used to set a verification level. By operating the setting portion 1401, verification accuracy is able to be changed. As the level of verification accuracy becomes higher, the verification device 109 determines a read image as a defective image even when a difference between a reference image and the read image is slight.

A setting portion 1402 is used to set a verification type. The setting portion 1402 is able to set a verification item in accordance with a purpose of verification of the user. FIG. 9A indicates that a position, color shade, a streak, and missing are to be verified but a density is not to be verified. A button 1403 is used to instruct completion of confirmation of the setting of the verification.

FIG. 9B illustrates an example of a screen displayed in the display portion 241 of the verification device 109 when a verification result is displayed. The display screen of FIG. 9B is displayed when the button 406 of FIG. 4A is pressed. In an area 1501, an attribute of an entire job that is verified and a verification result are displayed. In the example of FIG. 9B, a job name is bill and one job is composed of 1000 sheets. The number of OK sheets indicates the number of sheets (pages) an image of each of which is determined as a normal image as a result of verification, and the number of NG sheets indicates the number of sheets (pages) an image of each of which is determined as a defective image as a result of verification. A partition sheet is inserted on the basis of 1000 copies as the number of copies of a job and 50 copies as an interval of a partition sheet, which are set in setting of a job to be verified in FIG. 11B described later. In FIG. 11B, a partition sheet is inserted every predetermined number of sheets (every 50 sheets). A partition sheet ID 10001 indicates a verification result of sheets of a first page to a fiftieth page and a partition sheet ID 10002 indicates a verification result of sheets of a fifty-first page to a hundredth page. The recording sheets of the first page to the fiftieth page are associated with the partition sheet ID 10001. In the present embodiment, though one page is set per one copy, a plurality of pages may be certainly set per one copy.

In an area 1502, a verification result obtained for each of partition sheets is displayed. Here, as a partition sheet ID in the area 1502, a value obtained by reading a partition sheet ID on the basis of a content registered when a position of the partition sheet ID is registered in FIG. 8B is displayed. Further, the number of printed sheets (recording sheets) determined as a normal image and the number of printed sheets determined as a defective image for each of partition sheet IDs (for each of bundles partitioned by a partition sheet) are displayed. In a screen 1503, a job whose verification result is to be displayed is selected. A verification result of a first job (1000 sheets) among nine jobs whose histories are saved is displayed in the example of FIG. 9B. By operating a left or right button in the screen 1503, a job to be displayed is able to be switched. A button 1504 is used to instruct completion of confirmation of the verification result. When the button. 1504 is pressed, the screen returns to the display screen of FIG. 4A.

FIG. 10A illustrates an example of a screen displayed in the display portion 241 of the verification device 109 after verification starts. The display screen of FIG. 10A is displayed when the button 407 of FIG. 4A is pressed. In an area 1601, an image of a printed sheet that is read by the verification device 109 finally is displayed. In an area 1602, a determination result of comparing the read image in the area 1601 to the reference image is displayed. In the example of FIG. 10A, since the read image is determined as a normal image, OK is displayed.

A button 1603 is used to instruct end of verification. When the button 1603 is pressed, the verification device 109 ends verification processing and returns the screen to the display screen of FIG. 4A. A button 1604 is used to instruct display of a confirmation screen of a verification result of an entire job. When the button 1604 is pressed, the verification result of FIG. 9B is displayed.

FIG. 10B illustrates an example of a screen when the image that is finally read is determined as a defective image. Since the read image is determined as the defective image as a result of comparison to the reference image, NG is displayed and a factor of determination as NG and a position are displayed in the area 1602. FIG. 10B indicates that the read image is determined as the defective image because a streak 1705 is detected.

Figure 11A:
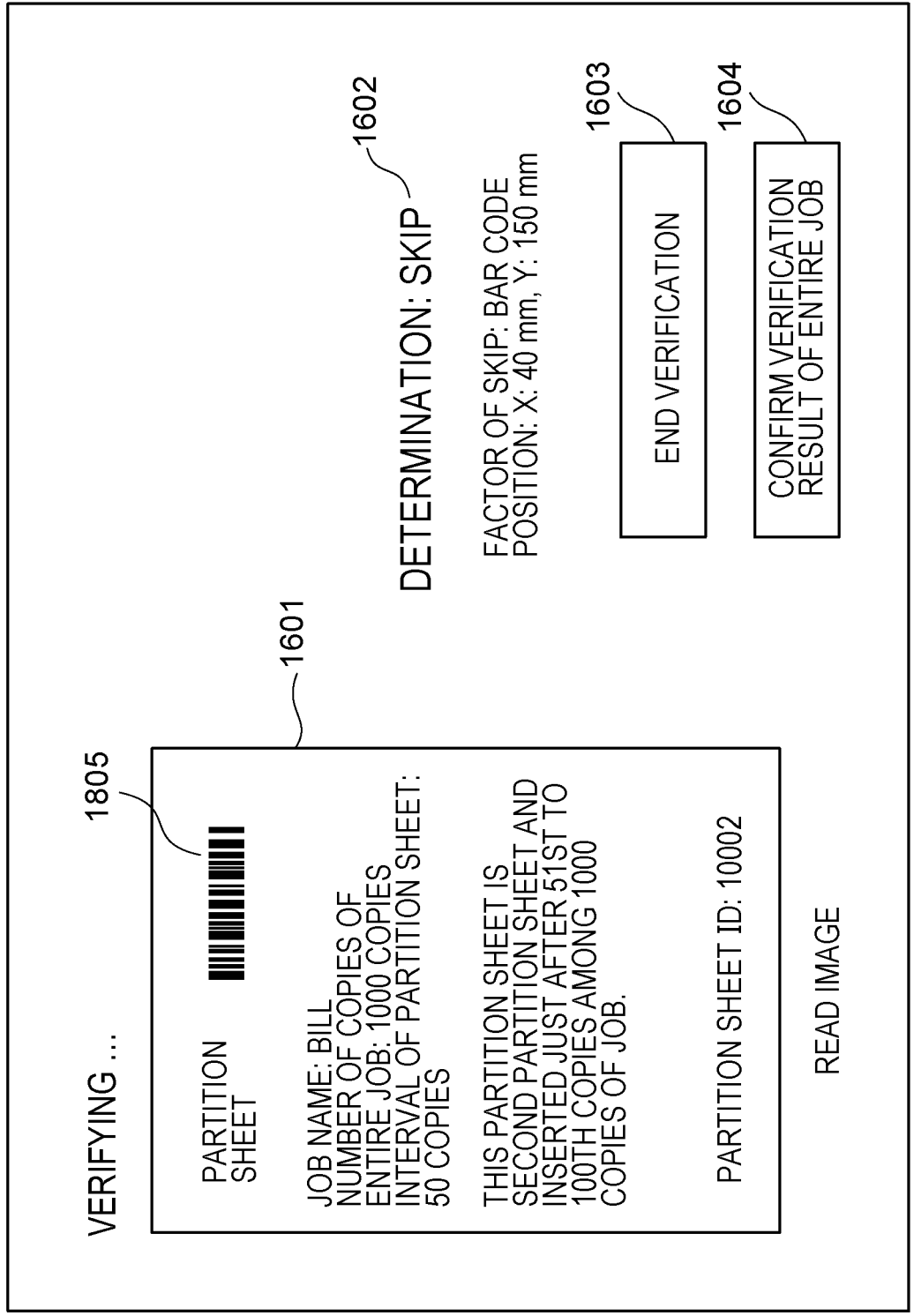

FIG. 11A illustrates an example of a screen when the image that is finally read is determined as a partition sheet. Since the read image is determined as the partition sheet, display indicating that verification is skipped and display of a factor that verification is determined to be skipped and a position are performed in the area 1602. FIG. 11A indicates that a bar code 1805 is detected and it is determined that the partition sheet determination condition set in FIG. 8A is satisfied.

FIG. 11B illustrates an example of a setting screen of a job to be verified, which is displayed in the display 212 of the external controller 102. Though FIGS. 4A to 11A each illustrate an example of a screen when setting of verification is performed for the verification device 109, an instruction to feed a printed sheet of a reference image, a partition sheet for setting, or a printed sheet to be verified to the verification device 109 is given from the external controller 102. Note that, the aforementioned setting of verification may be performed from the display portion 241 of the verification device 109.

A setting portion 1901 is used to set the number of copies of a job. In FIG. 11B, setting to print 1000 copies of the job is performed. In the example of FIG. 11B, one page is set per one copy and one job is composed of 1000 copies. Note that, as another example, a plurality of pages may be set per one copy. A setting portion 1902 is used to set an interval of a partition sheet. In the example of FIG. 11B, setting to insert a partition sheet every 50 copies is performed. Note that, the interval of the partition sheet may be set on the basis of the number of sheets.

A setting portion 1903 is used to set a discharge destination of a job to be verified. Here, the large-capacity stacker 110 is set as the discharge destination, and the escape tray 346 is set as the discharge destination to which a sheet is discharged when an image is determined as a defective image by verification. A button 1904 is used to print only one copy of the job and register the job as a reference image. When start of registration of the reference image is instructed to the verification device 109 by using the button 503 of FIG. 4B and an instruction to print one copy of the job to be verified is then given to the external controller 102 by using the button 1904, printing processing by the printer 107 and registration of the reference image by the verification device 109 are performed.

A button 1905 is used to instruct to feed a reference image from the inserter 108. The button 1905 is used when a printed sheet that has been already printed is read from the inserter 108 as the reference image. The button 1905 is used when printing and registration of the reference image are not performed at the same time but the reference image is read after an image is determined as a normal image by visual observation of the user. When the button 1905 is used, the user places a printed sheet, which is to be registered as the reference image in advance, on the inserter tray 321 of the inserter 108 to thereby convey the printed sheet to the verification device 109. Here, a sheet may be fed from the sheet feed portion 230 of the printer 107, but when a sheet is fed from the sheet feed portion 230, the sheet is pressurized and heated through the fixing unit 311 and the second fixing unit 313, so that an image of the printed image may be deformed. Accordingly, in a case where the printed sheet that has been printed is registered as reference image, the sheet is desired to be fed from the inserter 108 so as not to pass through the fixing units.

A button 1906 is used to perform setting of a partition sheet. In setting with the button 1906, a print content and a position of a specific bar code or QR code are able to be instructed so that the verification device 109 is able to determine that a sheet is a partition sheet. In setting with the button 1906, presence/absence and a position of a partition sheet ID are able to be set so as to be different for each of partition sheets. When the partition sheet ID is read by the verification device 109 and a verification result for each of partition sheets is displayed in the display portion 241 of the verification device 109, the user is able to easily confirm the verification result for each of partition sheets.

A button 1907 is used when an instruction to print a partition sheet for setting is given. When the instruction to print the partition sheet for setting is given by using the button 1907, the external controller 102 prints a bar code, a QR code, and a partition sheet ID, which are used to determine that a sheet is the partition sheet, on the basis of the partition sheet setting set with the button 1906 and conveys the resultant to the verification device 109. When an instruction to read a partition sheet image is given to the verification device 109 by selecting the button 903 of FIG. 6B and the partition sheet for setting is then printed by selecting the button 1907, the partition sheet image is read. After that, in the partition sheet setting screen of FIG. 7B, the partition sheet determination condition and the position of the partition sheet ID are able to be registered while confirming the partition sheet image that is read.

A button 1908 is used to instruct to start printing of the job to be verified. When start of printing is instructed by selecting the button 1908, the external controller 102 sends the job, which is to be verified, to the printer 107 on the basis of the setting of FIG. 11B. After start of verification is instructed to the verification device 109 by selecting the button 407 of FIG. 4A, start of printing of the job to be verified is instructed to the external controller 102 with the button 1908. Thereby, the external controller 102 sends print data to the printer 107 and instructs to convey the printed sheet that is printed to the verification device 109. When the printed sheet is conveyed, the verification device 109 reads an image of the printed sheet and performs verification processing.

Figure 12:
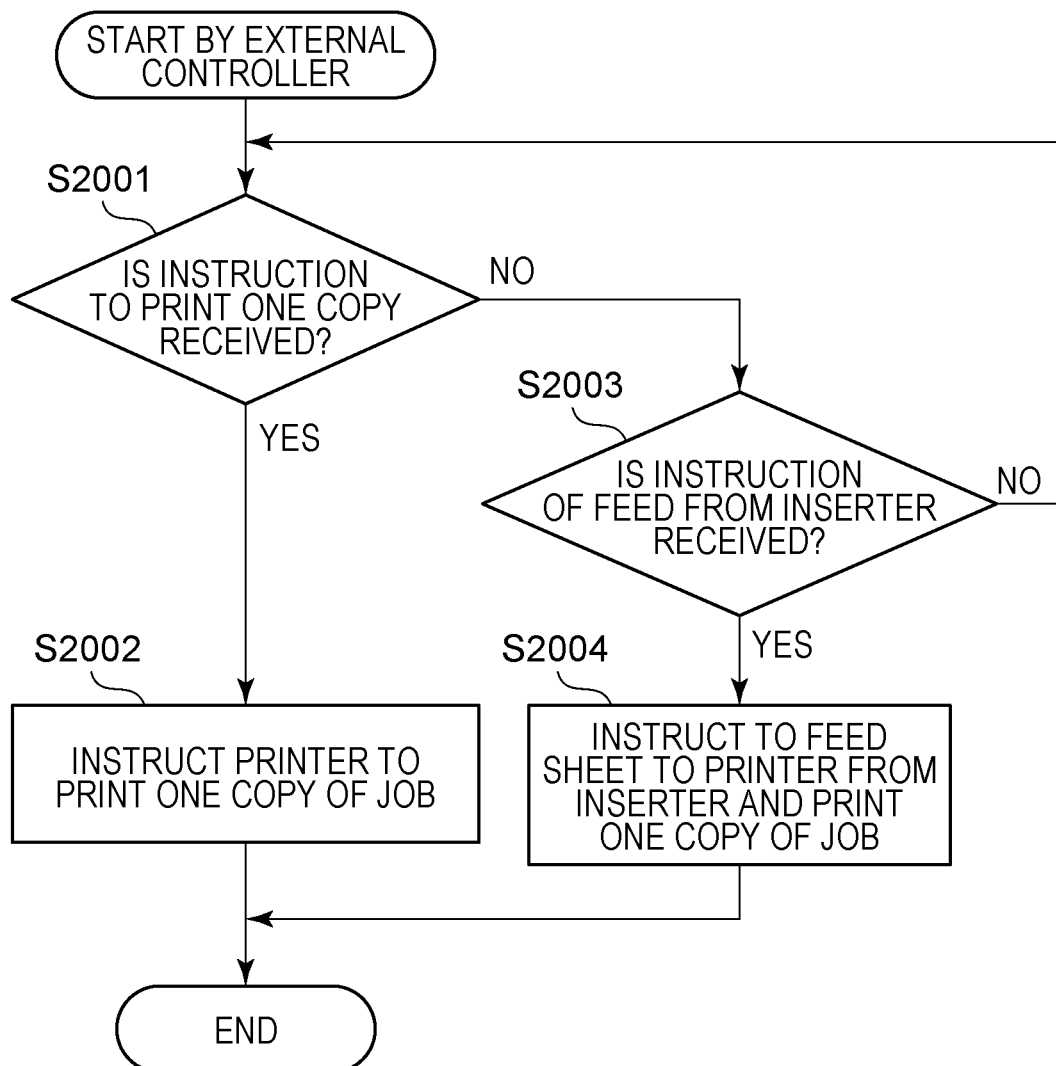
FIG. 12 illustrates a flow of processing of the external controller when a normal image is registered.

FIG. 12 is a flowchart illustrating a flow of processing performed by the external controller 102 when a reference image is registered. A program to perform the flowchart of FIG. 12 has been stored in the HDD 210, and is read to the memory 209 and executed by the CPU 208.

At S2001, the external controller 102 determines whether an instruction to print one copy of a print job is received. When the button 1904 of FIG. 11B, which is used to instruct to print one copy, is selected, determination is performed as Yes at S2001. When the instruction to print one copy is received at S2001, the procedure proceeds to S2002 and the external controller 102 sends print data of one copy to the printer 107 and instructs to perform printing.

When the instruction to print one copy is not received at S2001, the procedure proceeds to S2003 and whether an instruction of feed from the inserter 108 is received is determined. When the button 1905 of FIG. 11B, which is used to feed the reference image from the inserter 108, is selected, determination is performed as Yes at S2003. When the instruction of feed from the inserter 108 is received at S2003, the procedure proceeds to S2004 and the external controller 102 instructs to feed a sheet by an amount for one copy to the printer 107 from the inserter 108. When the instruction of feed from the inserter 108 is not received at S2003, the procedure returns to S2001.

Figure 13:
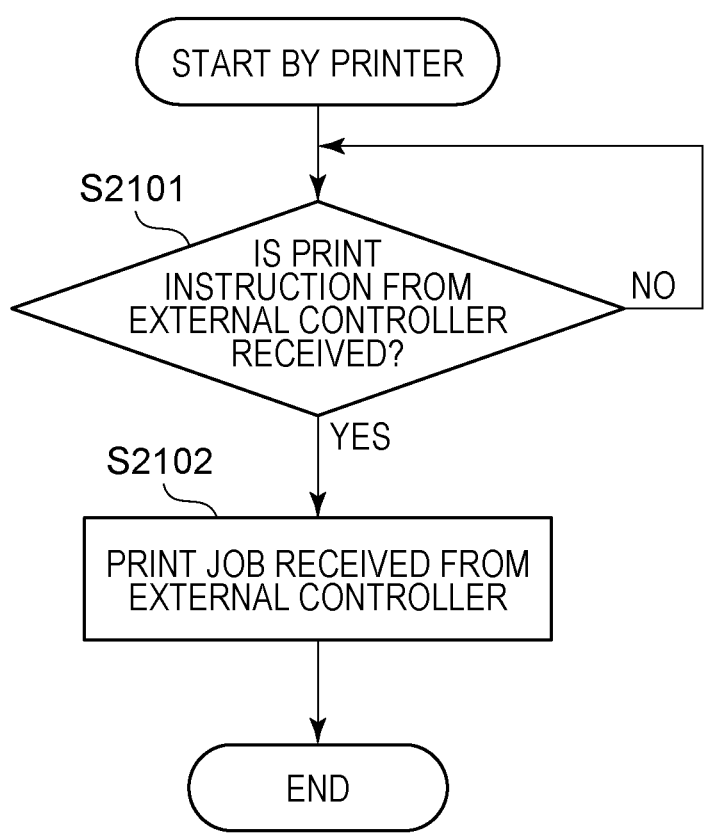
FIG. 13 illustrates a flow of processing of a printer when the normal image is registered.

FIG. 13 is a flowchart illustrating a flow of processing performed by the printer 107 when the reference image is registered. A program to perform the flowchart of FIG. 13 has been stored in the HDD 221, and is read to the memory 223 and executed by the CPU 222.

At S2101, the printer 107 waits for reception of the print instruction of the external controller 102. When the external controller 102 gives the print instruction to the printer 107 at S2002 or S2004 in FIG. 12 and the printer 107 receives the print instruction from the external controller 102, determination is performed as Yes at S2101. When the print instruction from the external controller 102 is received at S2101, the procedure proceeds to S2102 and the printer 107 prints the job, which is received from the external controller 102, at S2102. The job received from the external controller 102 also includes information about a feed destination and a discharge destination in addition to image data. In accordance with a content of the job received from the external controller 102, the printer 107 controls the inserter 108, the verification device 109, the large-capacity stacker 110, and the finisher 111 via the communication cable 254.

Figure 14:
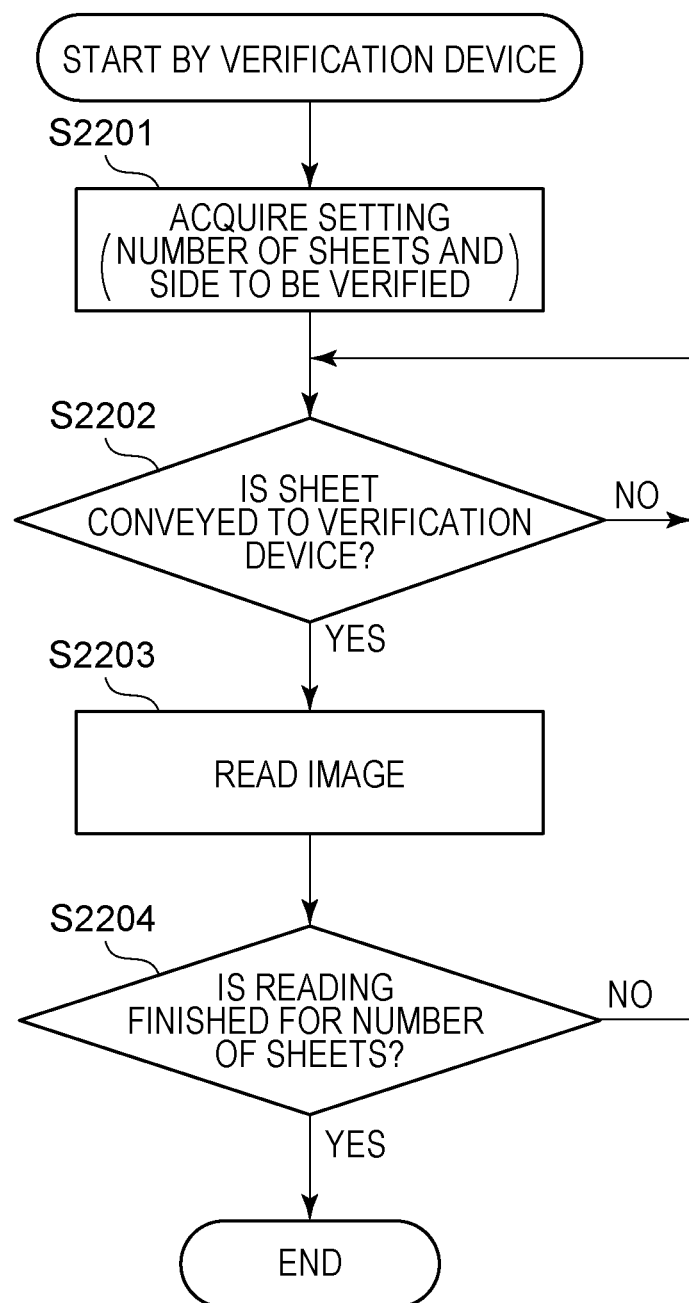
FIG. 14 illustrates a flow of processing of e verification device when the normal image is registered.

FIG. 14 is a flowchart illustrating a flow of processing performed by the verification device 109 when the reference image is registered. A program to perform the flowchart of FIG. 14 has been stored in the memory 239 and is executed by the CPU 238.

At S2201, the verification device 109 acquires setting of printing. Setting values acquired at S2201 include the number of sheets per one copy, a side to be verified, and the like that are set in FIG. 4B. Next, whether a sheet is conveyed to the verification device 109 is determined at S2202. When a sheet is conveyed at S2202, the procedure proceeds to S2203 and an image of the sheet is read by using the camera 331 or the camera 332 and saved in the memory 239 of the verification device 109. The image saved here is displayed in the area 701 of FIG. 5B.

Next, at S2204, the verification device 109 determines whether the image is read for the number of sheets acquired at S2201. When reading of the image is finished, the processing ends. When reading of the image for the number of sheets is not completed at S2204, the procedure proceeds to S2202.

Figure 15:
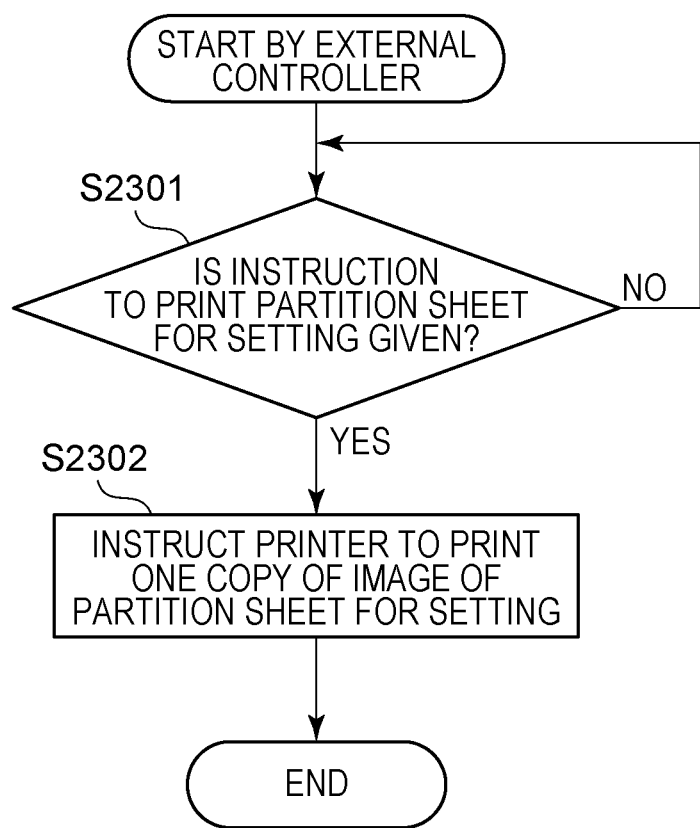
FIG. 15 illustrates a flow of processing of the external controller when a partition sheet image is set.

FIG. 15 is a flowchart illustrating a flow of processing performed by the external controller 102 when a partition sheet image is set. A program to perform the flowchart of FIG. 15 has been stored in the HDD 210, and is read to the memory 209 and executed by the CPU 208.

At S2301, the external controller 102 determines whether an instruction to print a partition sheet for setting is received. When the button 1907 of FIG. 11B, which is used to print the partition sheet for setting, is selected, determination is performed as Yes at S2301. When the instruction to print the partition sheet for setting is received at S2301, the procedure proceeds to S2302 and the external controller 102 instructs the printer 107 to print the partition sheet for setting. The print instruction of S2302 includes image data of the partition sheet. The image data of the partition sheet is generated by the external controller 102 on the basis of setting of the partition sheet with use of the button 1906 in FIG. 11B. The image data generated here includes a bar code and a partition sheet ID that are used to determine the partition sheet, as in the image of the area 1101 of FIG. 7B.

Figure 16:
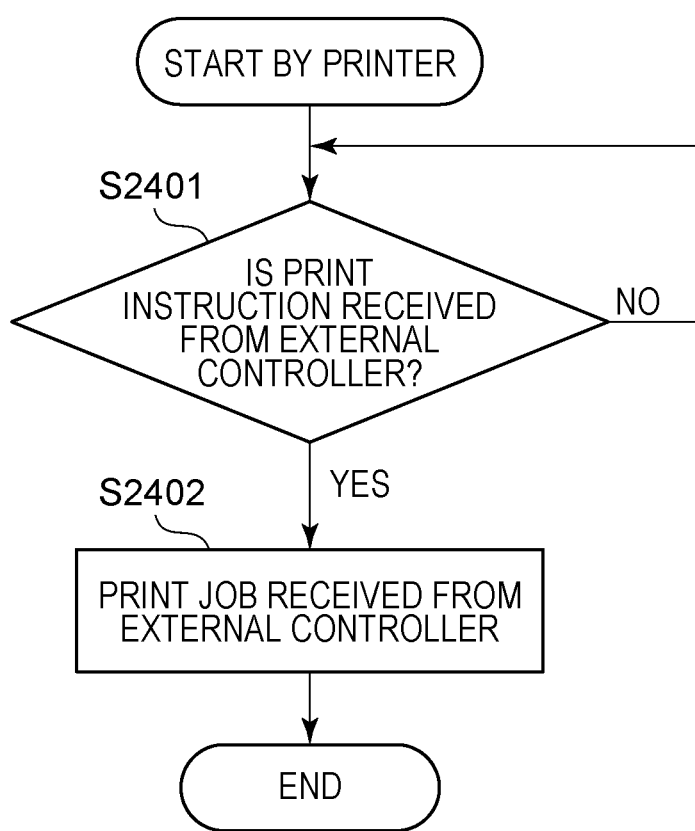
FIG. 16 illustrates a flow of processing of the printer when the partition sheet image is set.

FIG. 16 is a flowchart illustrating a flow of processing performed by the printer 107 when the partition sheet image is set. A program to perform the flowchart of FIG. 16 has been stored in the HDD 221, and is read to the memory 223 and executed by the CPU 222.

At S2401, the printer 107 determines whether the print instruction of the external controller 102 is received. When the external controller 102 gives the print instruction to the printer 107 at S2302 of FIG. 15 and the printer 107 receives the print instruction, determination is performed as Yes at S2401. When the print instruction from the external controller 102 is received at S2401, the procedure proceeds to S2402 and the printer 107 prints the job, which is received from the external controller 102, at S2402. In accordance with a content of the job received from the external controller 102, the printer 107 controls the inserter 108, the verification device 109, the large-capacity stacker 110, and the finisher 111 via the communication cable 254.

Figure 17:
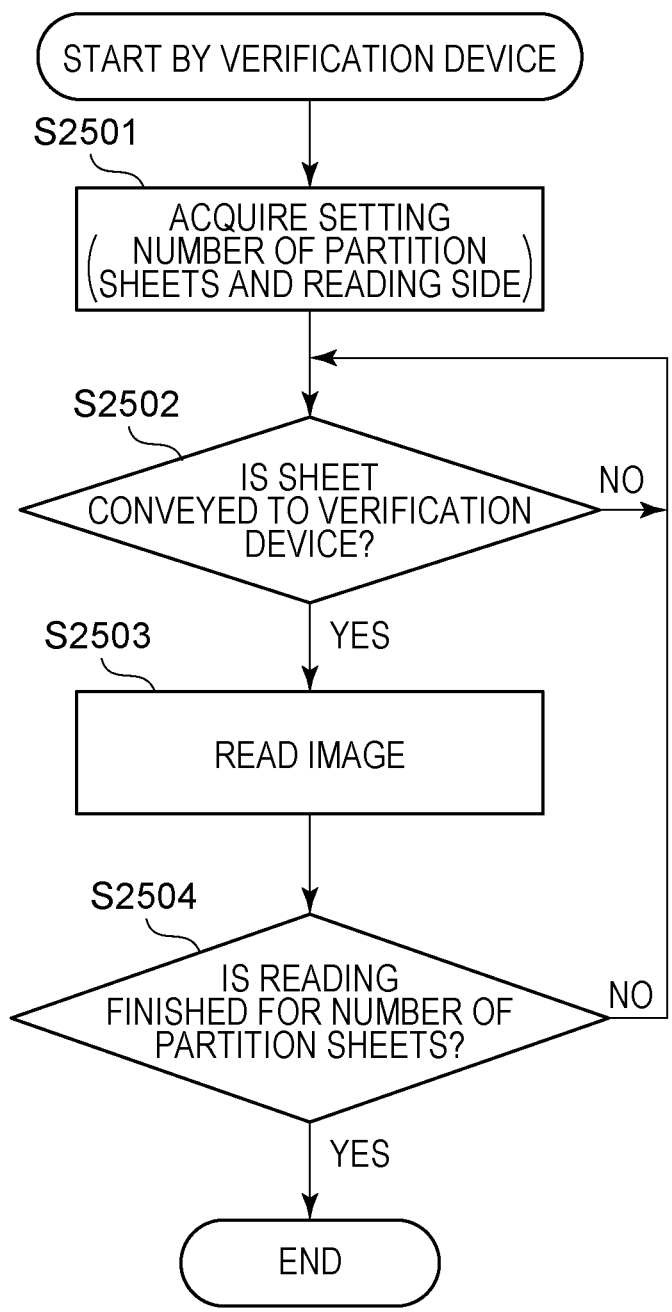
FIG. 17 illustrates a flow of processing of the verification device when the partition sheet image is set.

FIG. 17 is a flowchart illustrating a flow of processing performed by the verification device 109 when the partition sheet image is set. A program to perform the flowchart of FIG. 17 has been stored in the memory 239 and is executed by the CPU 238.

At S2501, the verification device 109 acquires setting of the partition sheet. Setting values acquired at S2501 include the number of registered partition sheets, a side to be read, and the like. Next, whether a sheet is conveyed to the verification device 109 is determined at S2502. When it is determined at S2502 that a sheet is conveyed, the procedure proceeds to S2503. At S2503, an image of the sheet is read by using the camera 331 or the camera 332 and saved in the memory 239 of the verification device 109. The image saved here is displayed in the area 1101 of FIG. 7B.

Next, at S2504, the verification device 109 determines whether the image is read for the number of partition sheets acquired at S2501. When reading of the image is finished, the processing ends. When reading of the image for the number of partition sheets is not completed at S2504, the procedure proceeds to S2502.

Figure 18:
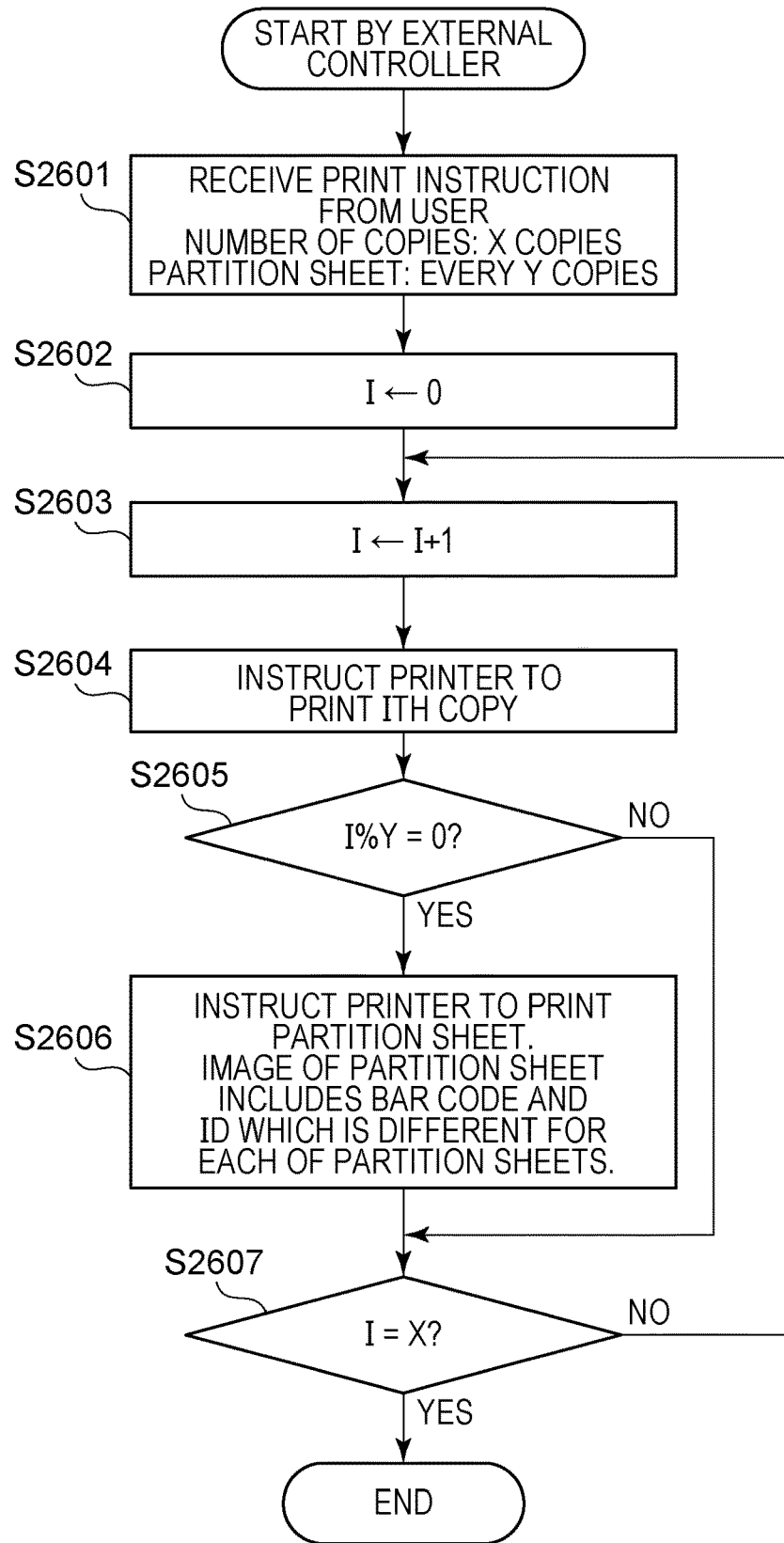
FIG. 18 illustrates a flow of processing of the external controller when verification processing is performed.

FIG. 18 is a flowchart illustrating a flow of processing performed by the external controller 102 when verification processing is performed. A program to perform the flowchart of FIG. 18 has been stored in the HDD 210, and is read to the memory 209 and executed by the CPU 208. When the button 1908 of FIG. 11B, which is used to start printing, is selected, the flowchart of FIG. 18 starts.

Upon reception of the print instruction by selecting the button 1908 to start printing, at S2601, the external controller 102 acquires setting of the number of copies of the job and the interval of the partition sheet. Here, a case where the number of copies of the job is set as X and the partition sheet is set to be inserted every Y copies will be described. Next, the procedure proceeds to S2602 and 0 as an initial value is assigned to I. Next, the procedure proceeds to S2603 and I+1 is assigned to I. Subsequently, the procedure proceeds to S2604 and the external controller 102 instructs the printer 107 to print an Ith copy.

Next, the procedure proceeds to S2605 and whether I is divisible by Y is determined. When I is not divisible by Y at S2605, the procedure proceeds to S2607. When I is divisible by Y at S2605, the procedure proceeds to S2606 and the external controller 102 instructs the printer 107 to print the partition sheet at S2606. The print instruction of S2606 includes image data of the partition sheet and the image data of the partition sheet is generated by the external controller 102 on the basis of setting of the partition sheet with use of the button 1906 in FIG. 11B. The image data generated here includes a bar code and a partition sheet ID that are used to determine the partition sheet, as in the area 1601 of FIG. 11A, and may also include information about a job, information about the number of printed copies, and the like. Here, when the partition sheet ID is differentiated for each of jobs or partition sheets, the user is able to easily confirm a verification result for each of partition sheet IDs from the area 1502 of FIG. 9B later.

Next, whether I and X are equal is determined at S2607. When I and X are not equal at S2607, printing for all the number of copies is not completed, so that the procedure returns to S2603. When I and X are equal at S2607, printing for all the number of copies is completed, so that printer 107 ends the processing.

Figure 19:
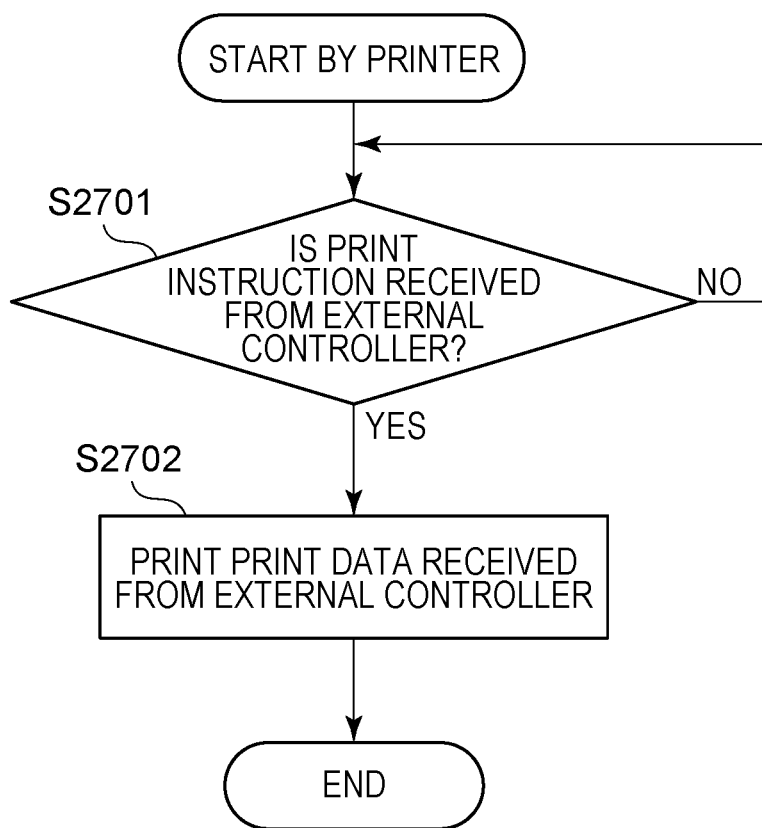
FIG. 19 illustrates a flow of processing of the printer when the verification processing is performed.

FIG. 19 is a flowchart illustrating a flow of processing performed by the printer 107 when the verification processing is performed. A program to perform the flowchart of FIG. 19 has been stored in the HDD 221, and is read to the memory 223 and executed by the CPU 222.

At S2701, the printer 107 determines whether the print instruction of the external controller 102 is received. When the external controller 102 gives the print instruction to the printer 107 at S2604 and S2606 of FIG. 18 and the printer 107 receives the print instruction, determination is performed as Yes at S2701. When the print instruction from the external controller 102 is received at S2701, the procedure proceeds to S2702. At S2702, the printer 107 prints the job received from the external controller 102. Here, in accordance with a content of the job received from the external controller 102, the printer 107 controls the inserter 108, the verification device 109, the large-capacity stacker 110, and the finisher 111 via the communication cable 254.

Figure 20:
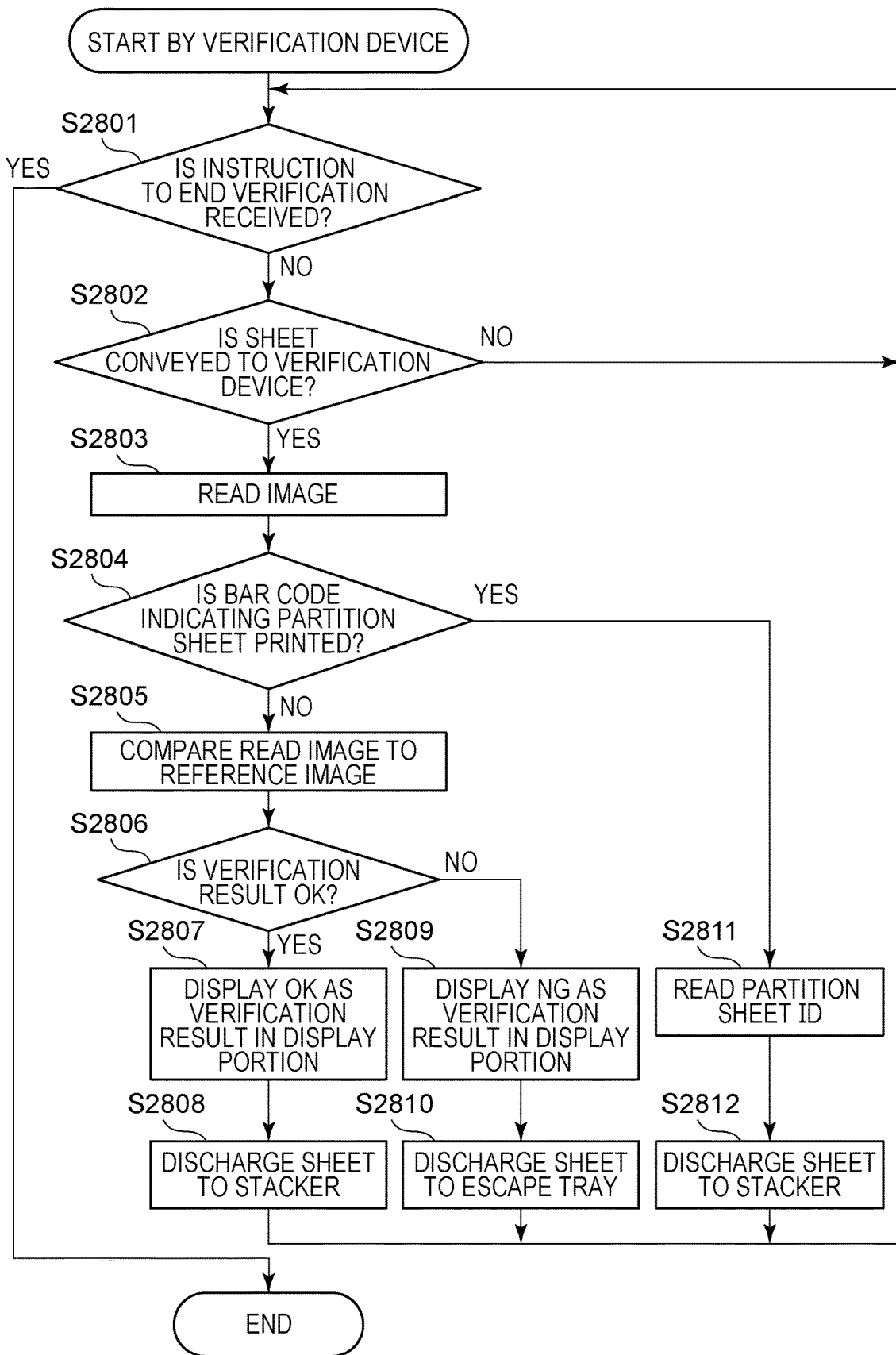
FIG. 20 illustrates a flow of processing of the verification device when the verification processing is performed.

FIG. 20 is a flowchart illustrating a flow of processing performed by the verification device 109 when the verification processing is performed. A program to perform the flowchart of FIG. 20 has been stored in the memory 239 and is executed by the CPU 238.

At S2801, the verification device 109 determines whether an instruction to end verification is received. When the button 1603 of FIG. 10A, which is used to end verification, is selected, determination is performed as Yes at S2801. When the instruction to end verification is received at S2801, the verification device 109 ends the processing. When the instruction to end verification is not received at S2801, the procedure proceeds to S2802.

At S2802, whether a sheet is conveyed to the verification device 109 is determined. When a sheet is not conveyed at S2802, the procedure returns to S2801. When it is determined at S2802 that a sheet is conveyed, the procedure proceeds to S2803. At S2803, an image of the sheet is read by using the camera 331 or the camera 332 and saved in the memory 239 of the verification device 109. The image saved here is displayed in the area 1601 of FIG. 10A.

Next, at S2804, the verification device 109 determines whether a bar code indicating a partition sheet is printed in the image read at S2803. In the partition sheet determination condition, a position and a type are set in FIG. 8A, and not only a bar code but also a QR code or image data may be used. When a bar code indicating a partition sheet is printed at S2804, the procedure proceeds to S2811. At S2811, a partition sheet ID printed on the partition sheet is read. The partition sheet ID read here is used when the verification result for each of partition sheets is displayed for each of partition sheet IDs in FIG. 9B.

Next, the procedure proceeds to S2812 and the verification device 109 instructs the printer 107 to discharge a printed sheet to the stack tray 341 of the large-capacity stacker 110. A discharge destination of the discharge here is a discharge destination set by the setting portion 1903 in FIG. 11B. In accordance with the instruction from the verification device 109, the printer 107 instructs the large-capacity stacker 110 to discharge the sheet to the stack tray 341. Next, the procedure proceeds to S2801 and the processing continues.

When a bar code indicating a partition sheet is not printed at S2804, the procedure proceeds to S2805. At S2805, the verification device 109 compares the image read at S2803 to a reference image. The reference image is based on setting registered with respect to the verification device 109 with the button 403 in FIG. 4A. An item to be compared at S2805 is a verification level set by the setting portion 1401 of FIG. 9A or a type of verification set by the setting portion 1402. Next, the procedure proceeds to S2806 and whether the read image is a normal image or a defective image is determined as a result of the comparison to the reference image at S2805.

When the read image is determined as the normal image (the verification result is OK) at S2806, the procedure proceeds to S2807. At S2807, display indicating that the verification result is OK is performed in the display portion 241 of the verification device 109. FIG. 10A illustrates an example of a screen displayed at S2807.

Next, the procedure proceeds S2808 and the verification device 109 instructs the printer 107 to discharge the printed sheet to the stack tray 341 of the large-capacity stacker 110. A discharge destination of the discharge here is a discharge destination set by the setting portion 1903 in FIG. 11B. In accordance with the instruction from the verification device 109, the printer 107 instructs the large-capacity stacker 110 to discharge the sheet to the stack tray 341. Next, the procedure proceeds to S2801 and the processing continues.

When the read image is determined as a defective image (the verification result is NG) at S2806, the procedure proceeds to S2809. At S2809, display indicating that the verification result is NG is performed in the display portion 241 of the verification device 109. FIG. 10B illustrates an example of a screen displayed at S2809. Next, the procedure proceeds to S2810 and the verification device 109 instructs the printer 107 to discharge the printed sheet to the escape tray 346 of the large-capacity stacker 110. A discharge destination of the discharge here is a discharge destination used when the verification result is NG and set by the setting portion 1903 in FIG. 11B. In accordance with the instruction from the verification device 109, the printer 107 instructs the large-capacity stacker 110 to discharge the sheet to the escape tray 346. Next, the procedure proceeds to S2801 and the processing continues.

Thereby, bundles of sheets verification results of which are OK and which are discharged to the stack tray 341 are partitioned by each partition sheet, but the number of sheets of one sheet bundle varies in accordance with the verification. Thus, in a case where it is desired to obtain a bundle of products that are determined to be normal by verification (the fixed number of sheets per one bundle), it is necessary to separately prepare products determined to be normal by verification and supply, for each of bundles of products, sheets by an amount of sheets determined to be defective sheets.

In the present embodiment, an instruction to print partition sheet IDs, which are different for each of partition sheets, on the partition sheets at S2602 and a verification result for each of partition sheet IDs is displayed in the display of the verification result in FIG. 9B. Thereby, the user is able to confirm the partition sheet ID described in the insertion sheet and the verification result for each of partition sheets displayed in the display portion 241 of the verification device 109 and easily confirm, for each of bundles of products, the number of copies which are determined to be defective images and discharged to another discharge destination.

Embodiment 2

In Embodiment 1, setting of the verification device 109 is operated by using the display portion 241 of the verification device 109 and a print instruction of a job to be verified is operated by using the display 212 of the external controller 102, but there is no limitation to such a configuration. The setting of the verification and the print instruction may be performed by another configuration as long as being able to be operated by any of the external controller 102, the printer 107, the verification device 109, and the client PC 103. For example, a configuration in which both the setting of the verification and the print instruction are operated by using the display 225 of the printer 107 may be adopted.

Moreover, in Embodiment 1, the verification result for each of partition sheet IDs is displayed in the display portion of the verification device 109, but a method of notifying the verification result is not limited thereto. For example, the verification result may be displayed as report print after printing for all the number of copies is completed. Additionally, the notification may be performed to the user with an E-mail or the like.

According to the disclosure, it is possible to confirm a verification result for each of bundles by using a bundle identifier printed on an insertion sheet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068835, filed Mar. 29, 2019, which is hereby incorporated by reference herein in its entirety.

What is claimed is:

1. An inspection apparatus for inspecting printings printed by a printing apparatus, the inspection apparatus comprising:
   a sheet side setting unit configured to set a recording sheet side to be inspected of a recording sheet selected from a group at least including both sides and a single side of a recording sheet;
   a number of sheets setting unit configured to set a number of recording sheets per one copy;
   an acquisition unit configured to acquire an image obtained by reading printings printed on the number of recording sheets based on the number set by the number of sheets setting unit;
   a registration unit configured to register, based on a user instruction, a reference image based on the obtained image; and an inspection unit configured to inspect, based on the reference image registered by the registration unit, an inspection target image that has been read, wherein the inspection unit inspects the inspection target image printed on the recording sheet side set by the sheet side setting unit.

2. The inspection apparatus according to claim 1, wherein the registration unit registers, as the reference image, an indication image obtained by reading the number of recording sheets set by the number of sheets setting unit.

3. The inspection apparatus according to claim 1, wherein, after the reference image is printed on the recording sheet side and the recording sheet side is set, after setting the number of recording sheets per one copy, and based on a registration instruction for registering the reference image, (i) print data is acquired from an external apparatus, (ii) the printing apparatus prints an image on the recording sheet based on the acquired print data, (iii) the image printed by the printing apparatus is read, and (iv) the registration unit registers the reference image based on the read image.

4. The inspection apparatus according to claim 1, wherein the recording sheet side set by the sheet side setting unit is any of both sides, a front side only, or a back side only.

5. The inspection apparatus according to claim 1, further comprising a display unit configured to display a preview of the reference image registered by the registration unit.

6. The inspection apparatus according to claim 1, further comprising an area setting unit configured to set an inspection skip area from the reference image displayed for preview by a display unit.

7. The inspection apparatus according to claim 1, wherein the single side is either a front side or a back side of the recording sheet.

8. A method for controlling an inspection apparatus for inspecting printings printed by a printing apparatus, the method comprising:
   setting a recording sheet side to be inspected of a recording sheet selected from a group at least including both sides and a single side of a recording sheet;
   setting a number of recording sheets per one copy;
   acquiring an image obtained by reading printings printed on the number of recording sheets based on the set number;
   registering, based on a user instruction, a reference image based on the obtained image; and
   inspecting, based on the registered reference image, an inspection target image that has been read,
   wherein inspecting includes inspecting the inspection target image printed on the set recording sheet side.

9. The method according to claim 8, wherein registering includes registering, as the reference image, an indication image obtained by reading the set number of recording sheets.

10. The method according to claim 8, wherein, after the reference image is printed on the recording sheet side and the recording sheet side is set, after setting the number of recording sheets per one copy, and based on a registration instruction for registering the reference image, (i) print data is acquired from an external apparatus, (ii) the printing apparatus prints an image on the recording sheet based on the acquired print data, (iii) the image printed by the printing apparatus is read, and (iv) the reference image is registered based on the read image.

11. The method according to claim 8, wherein the set recording sheet side is any of both sides, a front side only, or a back side only.

12. The method according to claim 8, further comprising displaying a preview of the registered reference image.

13. The method according to claim 8, further comprising setting an inspection skip area from the reference image displayed for preview.

14. The method according to claim 8, wherein the single side is either a front side or a back side of the recording sheet.

15. A non-transitory computer-readable storage medium storing a program to cause a computer to perform a method for controlling an inspection apparatus for inspecting printings printed by a printing apparatus, the method comprising:
   setting a recording sheet side to be inspected of a recording sheet selected from a group at least including both sides and a single side of a recording sheet;
   setting a number of recording sheets per one copy;
   acquiring an image obtained by reading printings printed on the number of recording sheets based on the set number;
   registering, based on a user instruction, a reference image based on the obtained image; and
   inspecting, based on the registered reference image, an inspection target image that has been read,
   wherein inspecting includes inspecting the inspection target image printed on the set recording sheet side.

16. An inspection apparatus for inspecting printings printed by a printing apparatus, the inspection apparatus comprising:
   a number of sheets setting unit configured to set a number of recording sheets per one copy;
   an acquisition unit configured to acquire an image obtained by reading printings printed on the number of recording sheets based on the number set by the number of sheets setting unit;
   a registration unit configured to register, based on a user instruction, a reference image based on the obtained image; and
   an inspection unit configured to inspect, based on the reference image registered by the registration unit, an inspection target image that has been read.

* * * * *